United States Patent [19]
Miura et al.

[11] Patent Number: 5,748,822
[45] Date of Patent: May 5, 1998

[54] OPTICAL MODULE FOR CONNECTING OPTICAL ELEMENT AND OPTICAL FIBER

[75] Inventors: Kazunori Miura; Seimi Sasaki; Ryoichi Ochiai; Hideo Sumiyoshi; Goji Nakagawa, all of Kawasaki, Japan

[73] Assignee: Fujitsu Limited, Kawasaki, Japan

[21] Appl. No.: 615,158

[22] Filed: Mar. 12, 1996

[30] Foreign Application Priority Data

Jul. 10, 1995 [JP] Japan ..................... 7-173803

[51] Int. Cl.$^6$ ........................... G02B 6/36
[52] U.S. Cl. .................. 385/90; 385/49; 385/89; 385/92
[58] Field of Search ............... 385/49, 88–94

[56] References Cited

U.S. PATENT DOCUMENTS 5,414,787  5/1995  Kurata ..................... 385/92
5,422,972  6/1995  Chambers et al. ............ 385/90

*Primary Examiner*—John Ngo
*Attorney, Agent, or Firm*—Staas & Halsey

[57] ABSTRACT

An optical module includes a mounting board, an optical element, an optical fiber having an optical axis, the optical fiber inserted in the mounting board to align the optical axis with the optical element, and a positioning mark provided to position the optical element on the mounting board. The mounting board has a groove provided in the middle of the mounting board and extending in a direction of the optical axis of the optical fiber, the groove enclosing the optical fiber when inserted. The groove has a vertical wall which is perpendicular to the direction of the optical axis and confronts a leading edge of the optical fiber when inserted. The positioning mark is located adjacent to an internal edge of the groove where the vertical wall is provided on the mounting board.

47 Claims, 29 Drawing Sheets

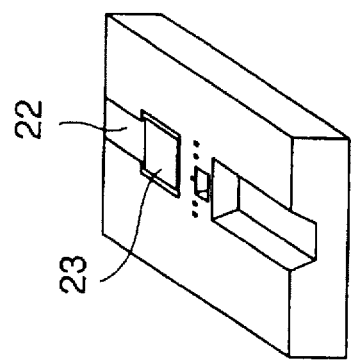
FIG. 3C
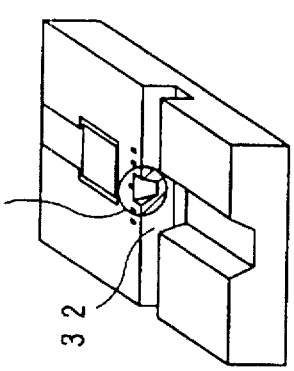
FIG. 3F
FIG. 3B
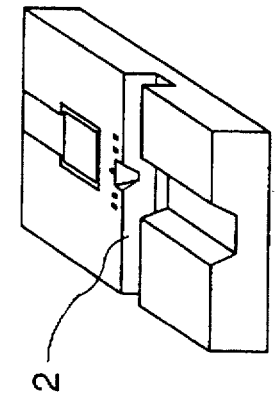
FIG. 3E
FIG. 3A
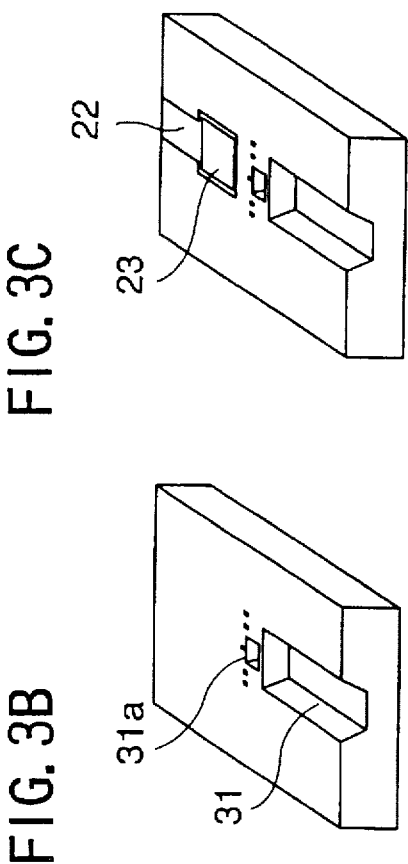
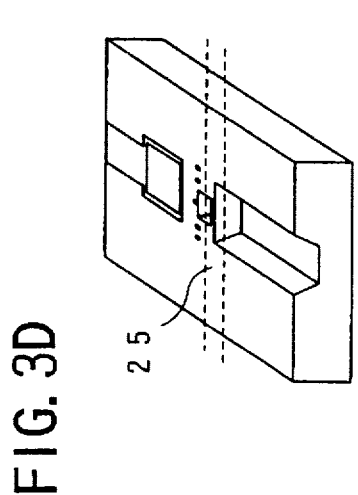
FIG. 3D
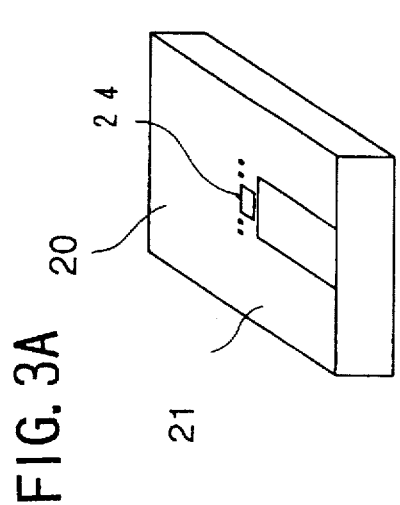

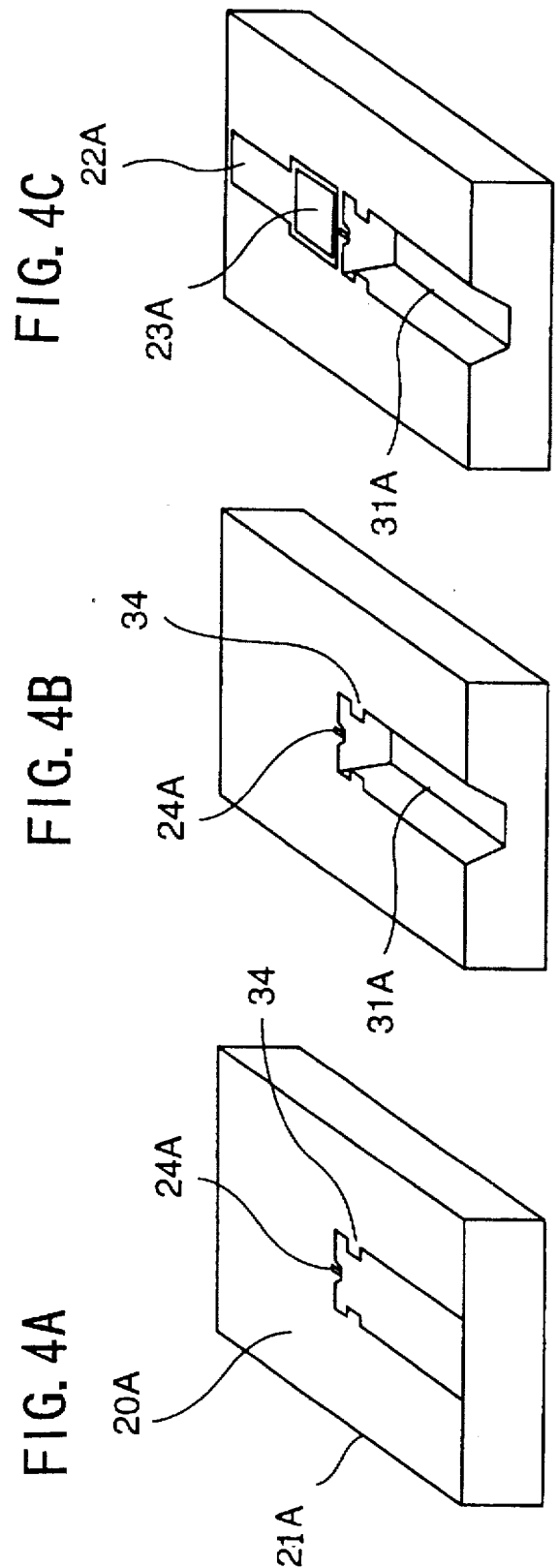

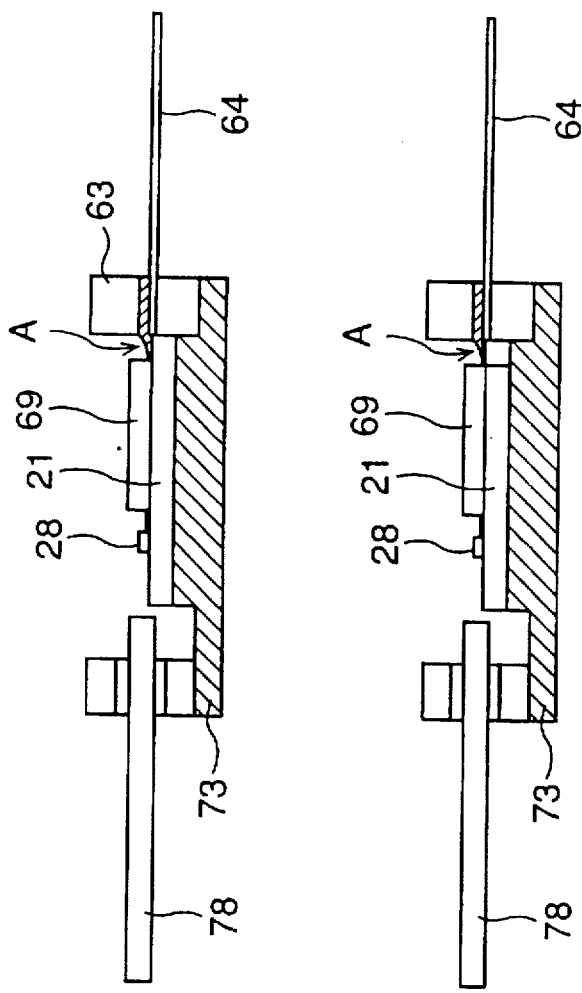

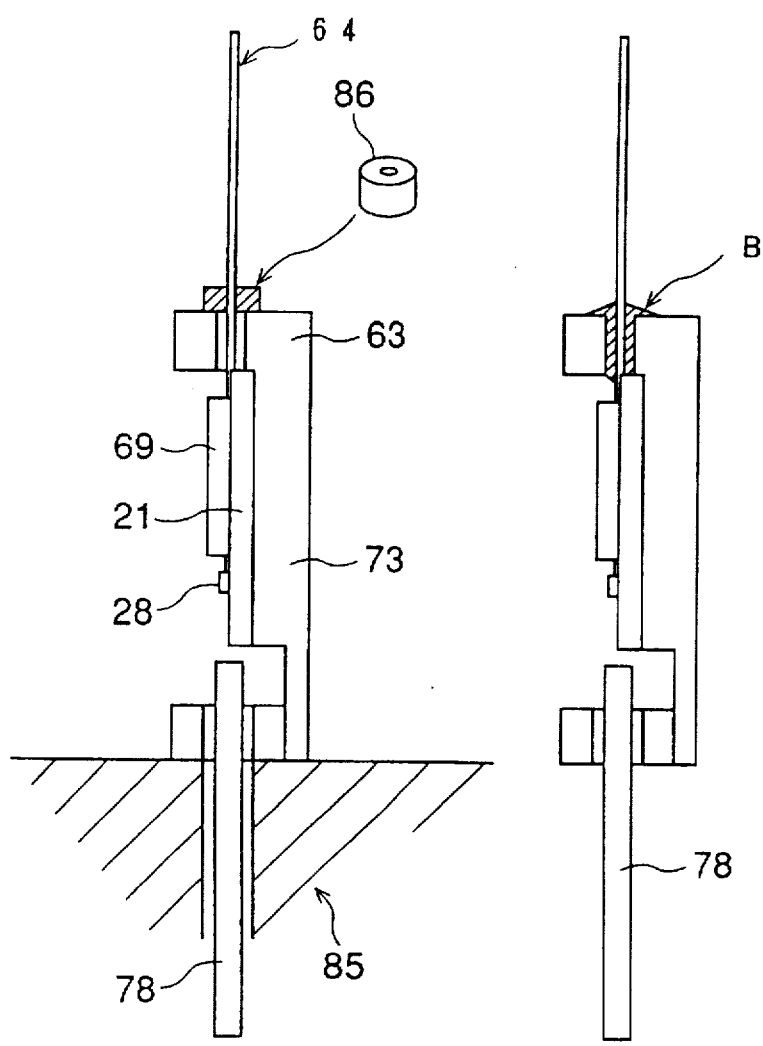

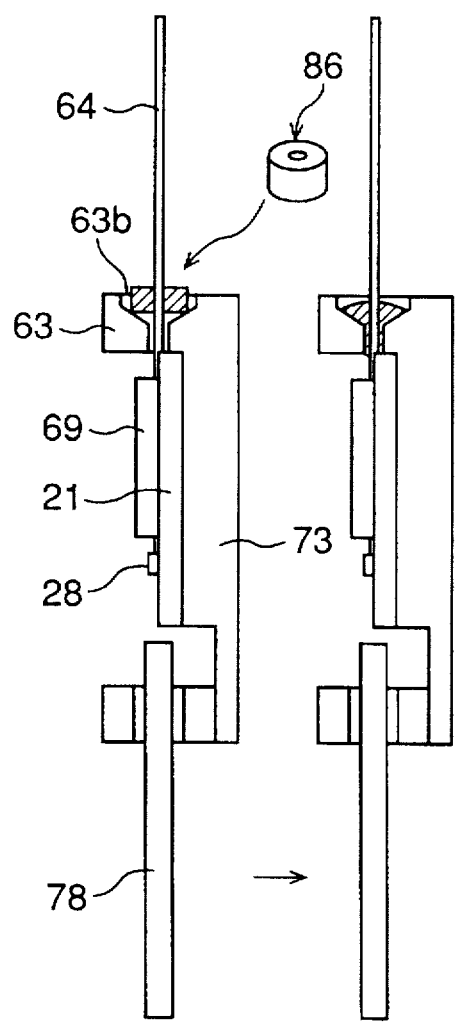
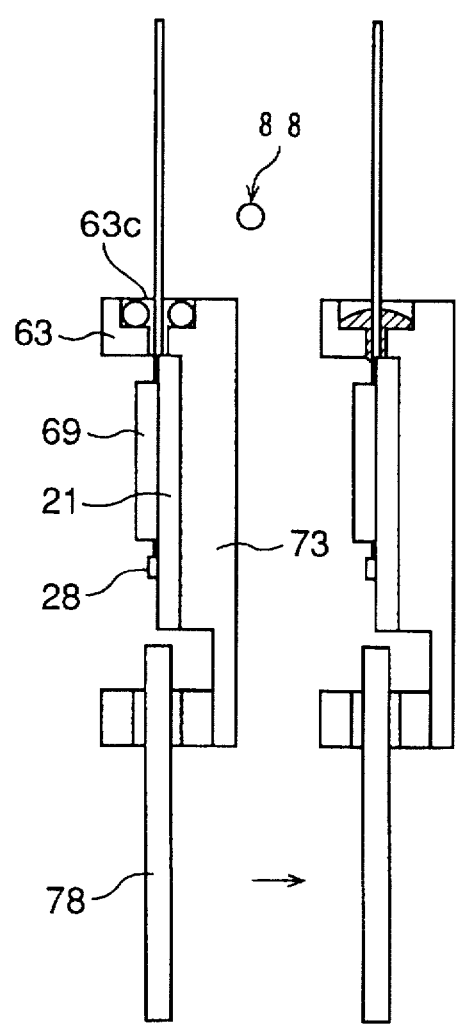

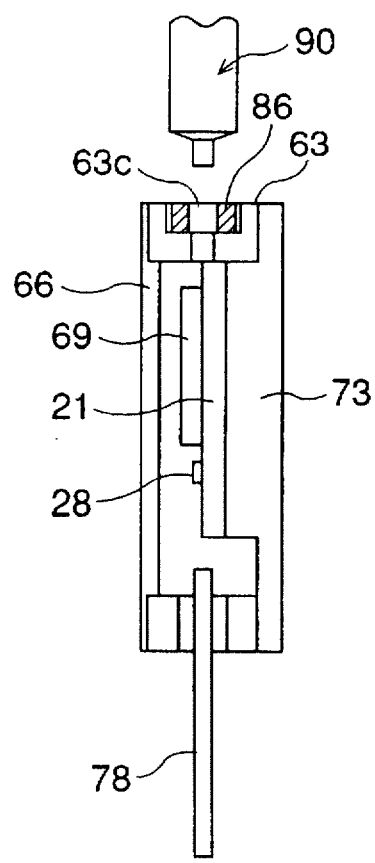

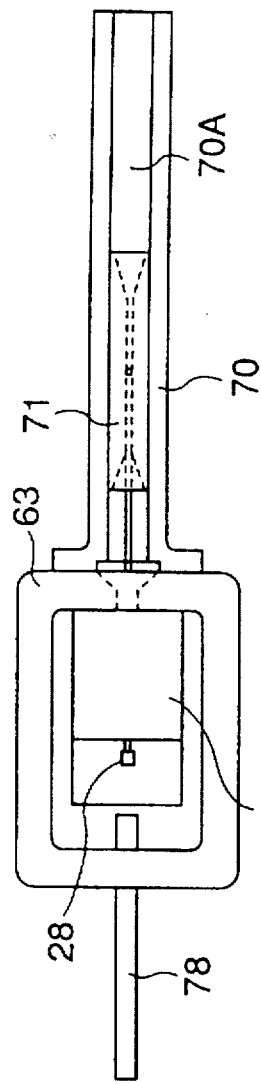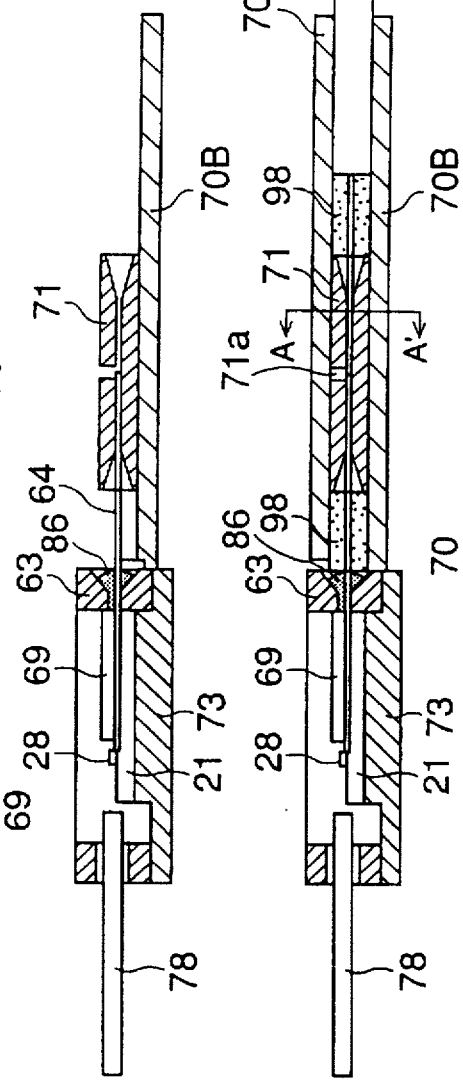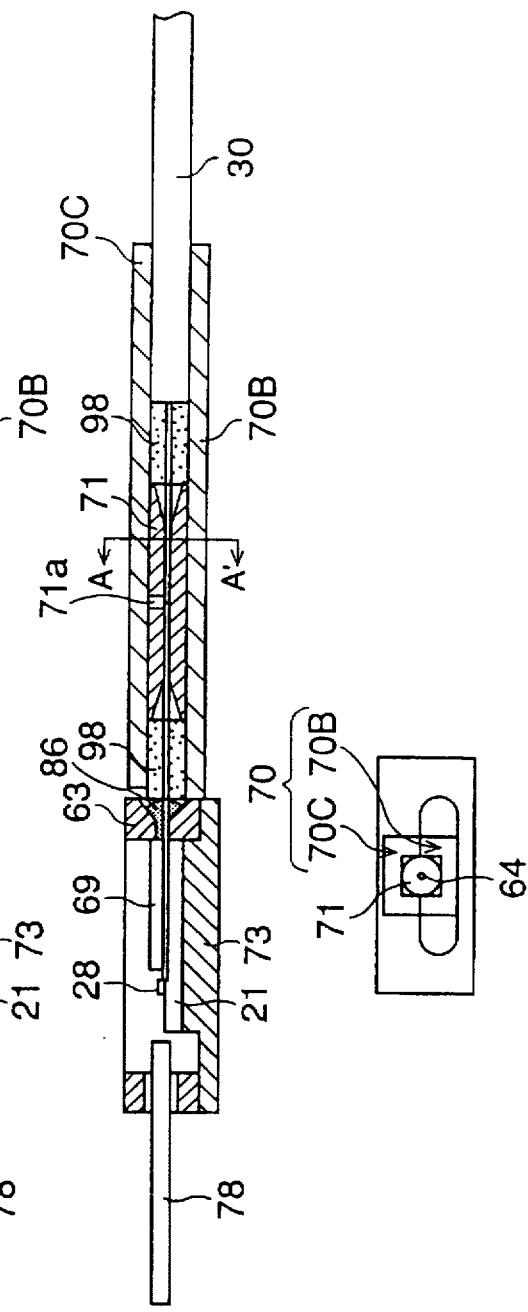

OPTICAL MODULE FOR CONNECTING OPTICAL ELEMENT AND OPTICAL FIBER

BACKGROUND OF THE INVENTION

(1) Field of the Invention

The present invention relates to an optical module having an optical element, such as a laser-diode or a photo-diode, connected to an optical fiber, and to a method of producing the optical module. More particularly, the present invention relates to an optical module in which the optical element is supported on a mounting board and connected to an optical fiber.

Recently, optical fiber transmission has made great progress. The optical fiber transmission has various advantages including transmission of a large amount of data, a low level of loss, no cross talk, no radiation and the like. In order to develop an optical fiber transmission system for practical use, it is important that optical parts, like the optical module, which constitute a part of the optical fiber transmission system, have high reliability and good productivity.

(2) Description of the Related Art

FIGS. 1A, 1B and 1C show a conventional optical module. Referring to FIGS. 1A, 1B and 1C, an insulating layer 7 is formed on a mounting board 1. The mounting board 1 is comprised of a silicon (Si) substrate, and the insulating layer 7 is a silicon dioxide ($SiO_2$) film. A metal layer 2 is formed on the insulating layer 7 as shown in FIG. 1A. A V-groove 4 is formed in the middle of the mounting board 1, the V-groove 4 extending in a longitudinal direction of the mounting board 1. An optical fiber 8 is enclosed by the V-groove 4. The V-groove 4 extends in a direction of the optical axis of the optical fiber 8.

FIG. 1B is an enlarged view of a portion of the conventional optical module where a laser-diode (LD) 3 and the optical fiber 8 are connected. As shown in FIG. 1B, a solder layer 9 is formed adjacent to an end of the V-groove 4, and the solder layer 9 is used to fix the laser-diode (LD) 3 to the mounting board 1. An electrode 5 is formed on the insulating layer 7. The electrode 5 is made of gold (Au). The electrode 5 is connected to and taken out from the solder layer 9, and the electrode 5 extends from the end of the solder layer 9 in the longitudinal direction of the mounting board 1.

The laser-diode (LD) 3 is positioned at a packaging location 10 on the mounting board 1 to correctly perform the coupling of the laser-diode 3 and the optical fiber 8 with respect to the direction of the optical axis of the optical fiber 8. The packaging location 10 is indicated by a dotted line in FIG. 1B, and it surrounds the periphery of the solder layer 9. A positioning mark 11 is provided on the mounting board 1 and attached to the electrode 5, and the positioning mark 11 is used to indicate the packaging location 10 for positioning the laser-diode 3 on the mounting board 1 at a proper location. The positioning mark 11 has a rectangular shape, and it is located at an opposite side to a side of the packaging location where the V-groove 4 is formed.

FIG. 1C is a cross-sectional view of the portion of the conventional optical module shown in FIG. 1B. As shown in FIG. 1C, the V-groove 4 has a sloping wall 4a which confronts the leading edge of the optical fiber 8. Since the sloping wall 4a of the V-groove 4 comes in contact with the optical fiber 30 when the optical fiber 8 is placed in the V-groove 4 to approach the laser-diode 3, the conventional optical module requires a certain amount of gap 12 between the laser-diode (LD) 3 and the optical fiber 8. To reduce the gap 12 between the LD 3 and the optical fiber 8, it is necessary that the packaging position of the LD 3 on the mounting board 1 is a position at which the LD 3 projects from the end of the V-groove 4 toward the V-groove 4, as shown in FIG. 1C.

If the positioning mark 11 is located adjacent to the V-groove 4, the positioning mark 11 is concealed by the LD 3 and it cannot be used to position the LD 3 on the mounting board 1 during the assembly.

The V-groove 4 is formed by etching of the silicon board 1, and the V-groove 4 has to include a sloping surface. This sloping surface depends on the characteristics of the silicon crystal structure of the silicon board 1. The sloping surface of the V-groove 4 confronts the leading edge of the optical fiber 8 when inserted.

The above conventional optical module, shown in 1A, 1B and 1C, has a problem, that is, it is difficult to perform the positioning of the laser-diode 3 to the optical fiber 8 with high accuracy. To perform the positioning of the laser-diode 3, one must observe the positioning mark 11 which is located at the opposite side to the side of the packaging location 10 where the V-groove 4 is formed. In particular, it is very difficult to achieve a required level of accuracy of the positioning of the laser-diode 3 by eliminating a misalignment or rotation of the laser-diode 3 with respect to the direction of the optical axis of the optical fiber 8. Since the positioning of the optical element on the mounting board is difficult to perform, the conventional optical module produced by using the above production method is not reliable, and the productivity of the thus produced optical module is low.

SUMMARY OF THE INVENTION

An object of the present invention is to provide an improved optical module in which the above-mentioned problems are eliminated.

Another object of the present invention is to provide an optical module which provides a high level of reliability and improves productivity.

Still another object of the present invention is to provide an optical module which can be easily produced and allows the production of the optical module with a high level of accuracy.

The above-mentioned objects of the present invention are achieved by an optical module which includes: a mounting board; an optical element supported on the mounting board; an optical fiber having an optical axis, the optical fiber inserted in the mounting board to align the optical axis with the optical element; and a positioning mark provided on the mounting board to position the optical element on the mounting board, the mounting board having a groove provided in the middle of the mounting board and extending in a direction of the optical axis of the optical fiber, the groove enclosing the optical fiber when inserted, the groove having a vertical wall which is perpendicular to the direction of the optical axis and confronts a leading edge of the optical fiber when inserted, the positioning mark located adjacent to an internal edge of the groove where the vertical wall is provided on the mounting board.

The above-mentioned objects of the present invention are achieved by an optical module which includes: a mounting board; an optical element supported on the mounting board; an optical fiber having an optical axis, the optical fiber inserted in the mounting board to align the optical axis with the optical element; and a positioning mark provided on the mounting board to position the optical element on the mounting board, the mounting board having a groove provided in the middle of the mounting board and extending in a direction of the optical axis of the optical fiber, the groove enclosing the optical fiber when inserted, the positioning mark having a first projecting portion which inwardly projects over an internal edge of the groove and confronts a leading edge of the optical fiber when inserted.

The above-mentioned objects of the present invention are achieved by an optical module which includes: a mounting board; an optical element supported on the mounting board; an optical fiber having an optical axis, the optical fiber inserted in the mounting board to align the optical axis with the optical element; and a retaining board provided on the mounting board to retain the optical fiber, the mounting board having a first groove provided in the middle of the mounting board and extending in a direction of the optical axis of the optical fiber, the retaining board having a second groove provided in the middle of the retaining board and extending in the direction of the optical axis of the optical fiber, the first groove and the second groove being associated to form an insertion hole through which the optical fiber is inserted.

The above-mentioned objects of the present invention are achieved by an optical module which includes: a mounting board; at least one optical element supported on the mounting board; and at least one optical fiber having an optical axis, the optical fiber inserted in the mounting board to align the optical axis with the optical element, the mounting board having a groove extending in a direction of the optical axis of the optical fiber, the groove enclosing the optical fiber when inserted, the groove having a sloping surface which is perpendicular to the direction of the optical axis and confronts a leading edge of the optical fiber when inserted, the optical element being fixed to the sloping surface.

In the optical module of the present invention, the optical element can be easily positioned on the mounting board by viewing the positioning mark adjacent to the internal edge of the groove. The present invention thus makes it possible to easily produce the optical module, and the production of the optical module with a high level of accuracy.

Further, in the optical module of the present invention, the first groove of the mounting board and the second groove of the retaining board are associated to form an insertion hole which facilitates the insertion of the optical fiber. The present invention thus makes it possible to easily and reliably perform the positioning of the optical fiber.

Further, in the optical module of the present invention, the first portions of the mounting board and the second portions of the retaining board are connected with each other to position the mounting board and the retaining board with respect to each other. The relative positions of the mounting board and the retaining board on the optical module are easily determined with a high level of accuracy. Thus, the positioning of the optical fiber on the optical module with a high level of accuracy can be easily performed.

BRIEF DESCRIPTION OF THE DRAWINGS

Other objects, features and advantages of the present invention will be more apparent from the following detailed description when read in conjunction with the accompanying drawings in which:

FIGS. 3A through 3F are diagrams of a modification of the optical module shown in FIGS. 2A and 2B;

FIGS. 4A, 4B and 4C are diagrams of an optical module in a second embodiment of the present invention;

FIGS. 19A and 19B are cross-sectional views of an optical module in an eleventh embodiment of the present invention;

FIGS. 20A and 20B are diagrams for explaining a soldering process of the optical module in the eleventh embodiment;

FIGS. 21A and 21B are diagrams of an optical module in a twelfth embodiment of the present invention;

FIG. 23 is a diagram of a modification of the embodiment of FIGS. 22A, 22B and 22C;

FIGS. 27A through 27D are diagrams showing a connection of an optical fiber by using an insert holder;

DETAILED DESCRIPTION OF THE PREFERRED EMBODIMENTS

A description will now be given of the preferred embodiments of the present invention with reference to the accompanying drawings.

Figure 2A:
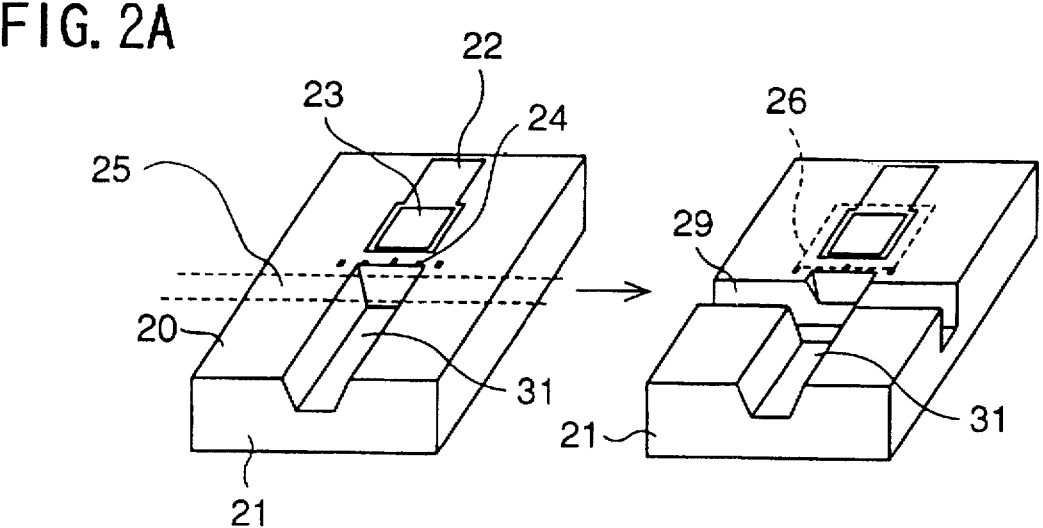
FIGS. 2A and 2B are diagrams of an optical module in a first embodiment of the present invention.
Figure 2B:
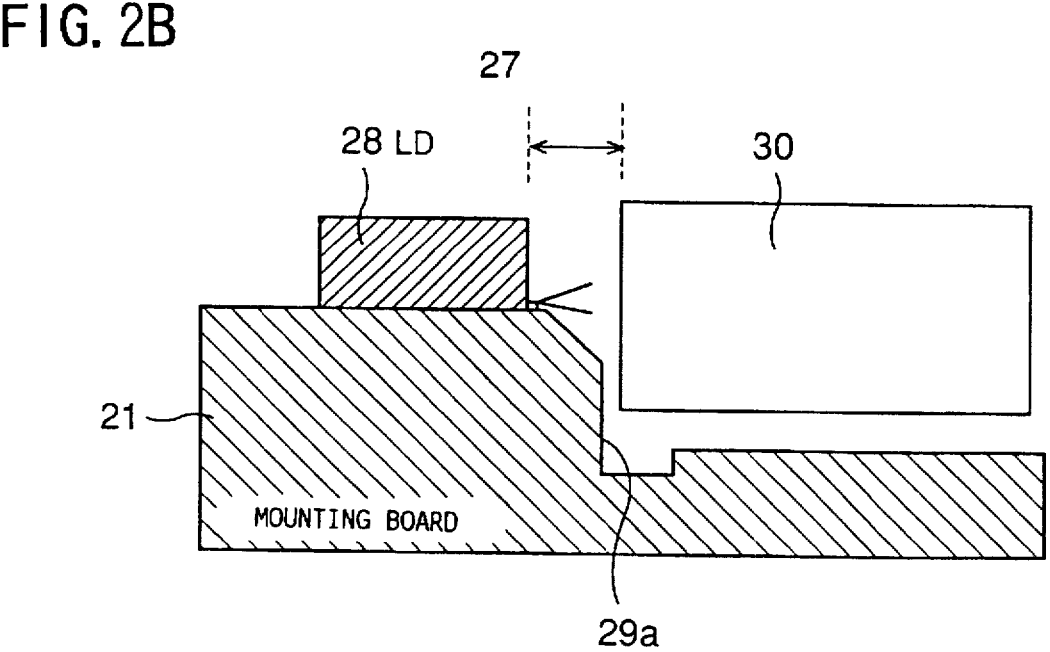

FIGS. 2A and 2B show an optical module in a first embodiment of the present invention.

Referring to FIGS. 2A and 2B, an insulating layer 20 is formed on the entire surface of a mounting board 21. The mounting board 21 is comprised of a silicon (Si) substrate, and the insulating layer 20 is a silicon dioxide ($SiO_2$) film. A V-groove 31 is formed in the middle of the mounting board 21, the V-groove 31 extending in a longitudinal direction of the mounting board 21 from an external edge of the mounting board 21 to an internal edge of the V-groove 31.

An optical fiber 30, shown in FIG. 2B, is inserted to the optical module and enclosed by the V-groove 31 in the middle of the mounting board 21. Thus, the V-groove 31 longitudinally extends in a direction of the optical axis of the optical fiber 30 (which is the direction of the optical axis of the optical fiber 30).

A solder layer 23 is formed on the mounting board 21 adjacent to the edge of the V-groove 31, and the solder layer 23 is used to fix a laser-diode (LD) 28 to the mounting board 21.

An electrode 22 is formed on the insulating layer 20 of the mounting board 21. The electrode 22 is connected to the solder layer 23, and extends further from an end of the solder layer 23 in the longitudinal direction of the mounting board 21 (the direction of the optical axis of the optical fiber 30).

In the first embodiment, a positioning mark 24, which is used to position the laser-diode (LD) 28 on the mounting board 21, is formed adjacent to the edge of the V-groove 31. A transverse groove 29 which crosses the V-groove 31 on the mounting board 21 and extends in a direction perpendicular to the optical axis of the optical fiber 31, is formed on the mounting board 21. A vertical wall 29a is formed by the transverse groove 29. The vertical wall 29a is located at the edge of the V-groove 31, and is perpendicular to the direction of the optical axis of the optical fiber 30. The vertical wall 29a is provided as a stopper for positioning the optical fiber 30 when inserted, in the direction of the optical axis of the optical fiber 30.

Figure 1A:
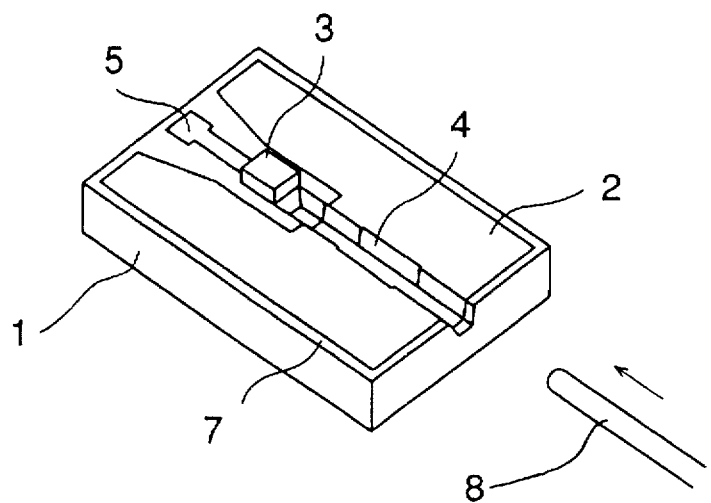
FIGS. 1A, 1B and 1C are diagrams of a conventional optical module.
Figure 1B:
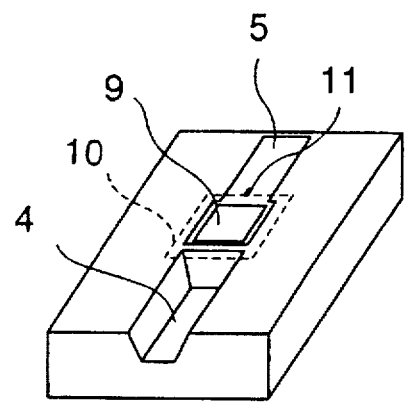
Figure 1C:
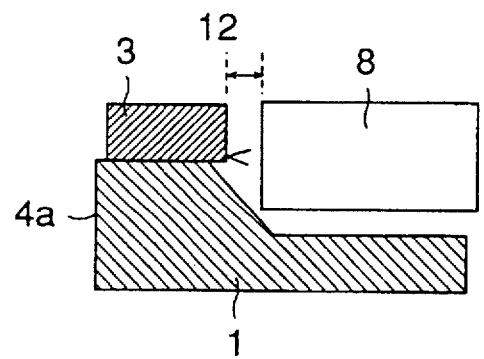

The groove 29 is formed by cutting of a cutting region 25 of the mounting board 21, indicated by dotted lines in FIG. 2A. The vertical wall 29a, located at the end of the V-groove 31, is formed by forming the groove 29 on the mounting board 21. Accordingly, the optical module of the first embodiment can place the end of the optical fiber 30 nearer to the laser-diode 28 on the mounting board 21 than the conventional optical module shown in FIGS. 1A through 1C.

More specifically, since the above first embodiment includes the vertical wall 29a, it is possible to make the gap 27 (FIG. 2B) between the laser-diode (LD) 28 and the optical fiber 30, shown in FIG. 2B, smaller than the gap 12 (FIG. 1C) between the laser-diode (LD) 3 and the optical fiber 8.

In the above first embodiment, even if the packaging location of the laser-diode 28 is changed to a position slightly distant from the end of the V-groove 31, it is possible to keep the gap 27 smaller than the gap 12 of the conventional optical module. Accordingly, the above first embodiment makes it possible to provide the positioning mark 24 at the position between the solder layer 23 and the end of the V-groove 31.

In the above first embodiment, when positioning the laser-diode 28 on the mounting board 21, the laser-diode 28 is first placed at a packaging location 26 indicated by a dotted line in FIG. 2A, and the positioning of the laser-diode 28 can be performed by viewing the positioning mark 24.

Therefore, the above first embodiment can provide a wider tolerance zone of the positioning location at which the laser-diode 28 is positioned, which is used to eliminate a misalignment or rotation of the laser-diode 28 on the mounting board 21 with respect to the direction of the optical axis of the optical fiber 30. The first embodiment makes it possible to perform more stably and easily the positioning of the laser-diode 28 on the mounting board 21.

The positioning mark 24, shown in FIGS. 2A and 2B, is a set of dots which is aligned on the mounting board 21 along a transverse line at the edge of the V-groove 31. This positioning mark 24 facilitates the positioning of the edge of the laser-diode 28 on the mounting board 21. A misalignment or rotation of the laser-diode 28 on the mounting board 21 with respect to the direction of the optical axis of the optical fiber 30 can more easily be eliminated.

As described above, the vertical wall 29a serves as the stopper for positioning the optical fiber 30, when inserted, in the direction of the optical axis of the optical fiber 30. If the leading edge of the optical fiber 30, when inserted, comes into contact with the vertical wall 29a, the positioning of the optical fiber 30 can automatically be performed.

FIGS. 3A through 3F show a modification of the optical module shown in FIGS. 2A and 2B.

The vertical wall 29a of the optical module produced by using a production method shown in FIGS. 3A through 3F may be used alternatively to that of the above first embodiment.

First, as shown in FIG. 3A, the positioning mark 24 is formed on the insulating layer 20 of the mounting board 21 at the edge of the V-groove 31. The insulating layer 20 for locations corresponding to small and large rectangular regions of the mounting board 21, indicated in FIG. 3A, is not formed.

As shown in FIG. 3B, an etching using an aqueous solution of potassium hydroxide (KOH) is performed to form the V-groove 31 in the middle of the mounting board 21 and a small rectangular groove 31a adjacent to the edge of the V-groove 31.

As shown in FIG. 3C, the electrode 22 is formed on the insulating layer 20 of the mounting board 21, and the solder layer 23 is formed on the electrode 22.

As indicated by dotted lines in FIG. 3D, the cutting region 25, including the internal edge of the V-groove 31 and the end of the groove 31a (adjacent to the internal edge of the V-groove 31), is preset. The cutting region 25 extends in a transverse direction perpendicular to the longitudinal direction of the mounting board 21.

As shown in FIG. 3E, a cutting process of the cutting region 25 of the mounting board 21 is performed so that a transversely extending vertical groove 32 is formed on the mounting board 21.

Finally, as shown in FIG. 3F, the packaging of the optical fiber 30 on the mounting board 21 is performed. A region 33 of the vertical groove 32, indicated by shaded lines in FIG. 3F, serves as the stopper for positioning the optical fiber 30 when inserted, in the direction of the optical axis of the optical fiber 30.

The region 33 of the stopper, shown in FIG. 3F, is greater in area than the vertical wall 29a of the stopper shown in FIG. 2B. The groove 31a shown in FIG. 3B has a width less than the width of the V-groove 31. For this reason, the stopper function of the region 33 of this embodiment in FIGS. 3A through 3F to position the optical fiber 30 on the mounting board 21 is more reliable and/or safer than the stopper function of the vertical wall 29a of the above first embodiment in FIGS. 2A and 2B.

In the embodiment shown in FIG. 3F, the groove of the optical module includes a first portion (the V-groove 31) having a first width and a second portion (the groove 31a) having a second width less than the first width, the first portion 31 enclosing the optical fiber 30 therein, the second portion 31a located adjacent to the positioning mark 24, and the vertical wall 29a located between the first portion 31 and the second portion 31a.

FIGS. 4A, 4B and 4C and FIGS. 5A and 5B show an optical module in a second embodiment of the present invention and a method of producing the optical module of the second embodiment. The optical module of the second embodiment includes a positioning mark 24A and stoppers 34 which are different from those of the above-described first embodiment.

As shown in FIG. 4A, an insulating layer 20A (the $SiO_2$ film) is formed on a mounting board 21A (the silicon substrate). A positioning mark 24A is formed on the insulating layer 20A of the mounting board 21A at a position as indicated in FIG. 4A.

As shown in FIG. 4B, an etching of the mounting board 21A using an aqueous solution of potassium hydroxide (KOH) is performed to form a V-groove 31A in the middle of the mounting board 21A. By this etching, the positioning mark 24A and the stoppers 34 on the insulating layer 20A are formed such that the positioning mark 24A projects from the edge of the V-groove 31A in the longitudinal direction of the mounting board 21A, and the stoppers 34 project toward the inside of the V-groove 31a in the transverse direction of the mounting board 21A.

As shown in FIG. 4C, an electrode 22A and a solder layer 23A are formed on the insulating layer 20A of the mounting board 21A.

Figure 5A:
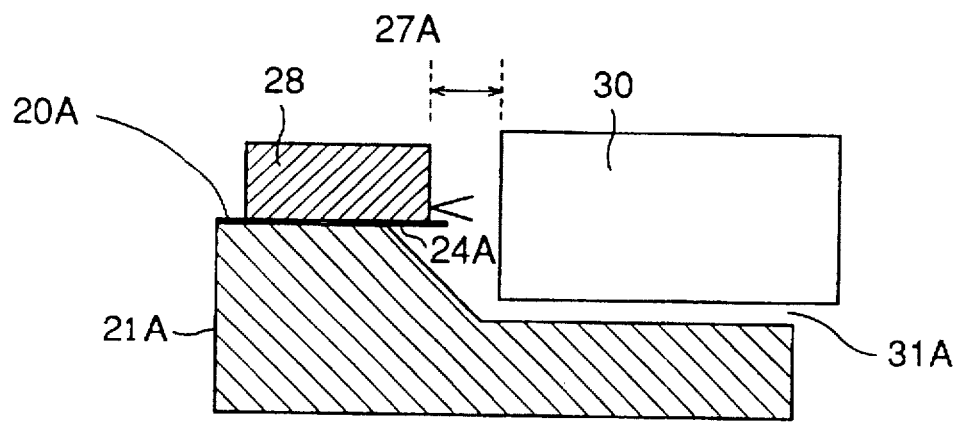
FIGS. 5A and 5B are diagrams of a connecting portion of the optical module shown in FIGS. 4A, 4B and 4C.
Figure 5B:
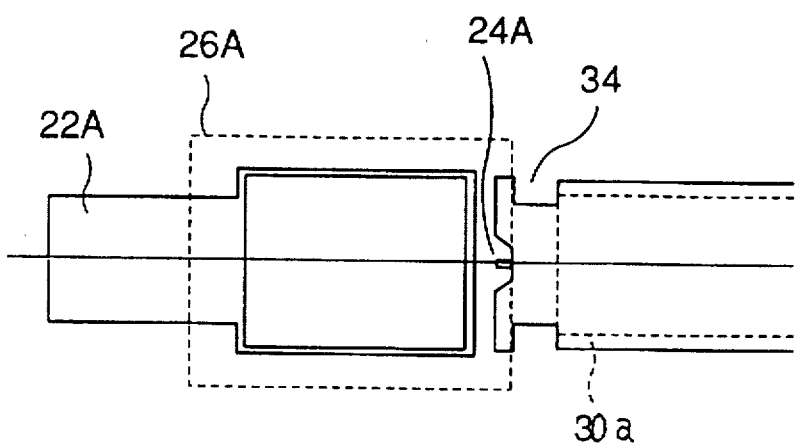

When the laser-diode 28 is packaged on the mounting board 21A, the positioning of the laser-diode 28 on the mounting board 21A can be performed by viewing the positioning mark 24A. As shown in FIGS. 5A and 5B, the laser-diode 28 is partially overlapped on the positioning mark 24A, and the laser-diode 28 located at a packaging location 26A, after the positioning is performed, projects from the edge of the V-groove 31A toward the inside of the V-groove 31A. The packaging location 26A of the laser-diode 28 is indicated by a dotted line in FIG. 5B.

The optical module of the second embodiment does not include vertical wall like the vertical wall 29a of the first embodiment. However, the sloping wall of the V-groove 31A of the second embodiment does not interfere with the leading edge of the optical fiber. Since the positioning mark 24A projects from the edge of the V-groove 31A and the stoppers 34 project toward the inside of the V-groove 31a, the gap 27A between the laser-diode 28 and the optical fiber 30 in the second embodiment can be reduced to an appropriate length.

When the leading edge of the optical fiber 30, after inserted, touches the two opposing stoppers 34 as shown in FIG. 5B, the optical fiber 30 is automatically positioned at a packaging location 30a. The packaging location 30a of the optical fiber 30 is indicated by a dotted line in FIG. 5B.

The method of producing the optical module of the second embodiment shown in FIGS. 4A through 4C does not require the cutting process of the first embodiment to form the transverse groove 29. The stoppers 34 and the V-groove 31A can be formed at the same time by the V-groove forming process of the second embodiment. Thus, the production method of the second embodiment can be performed more easily than the production method of the first embodiment.

Figure 6A:
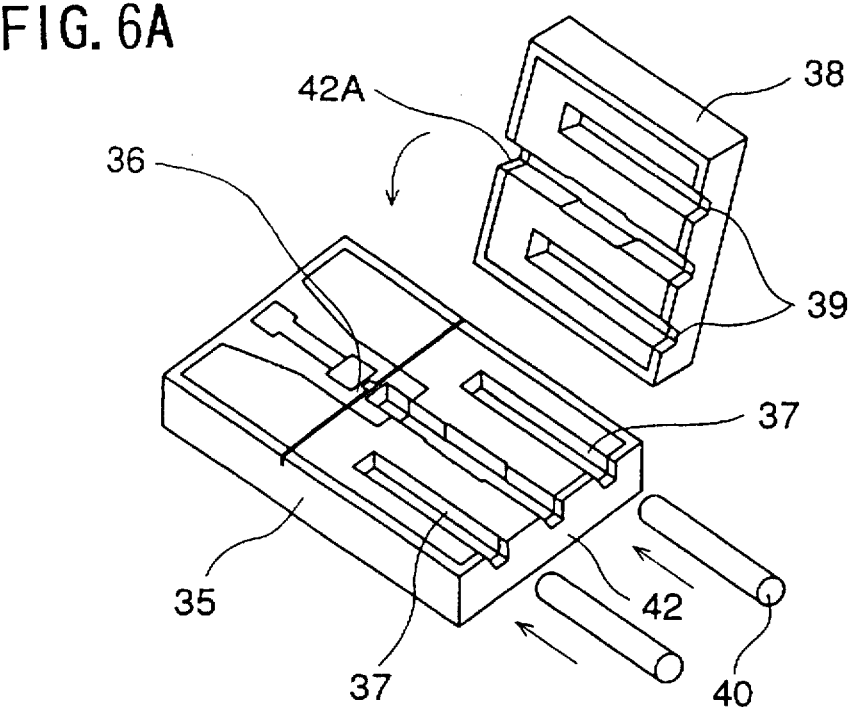
FIGS. 6A and 6B are diagrams of an optical module in a third embodiment of the present invention.
Figure 6B:
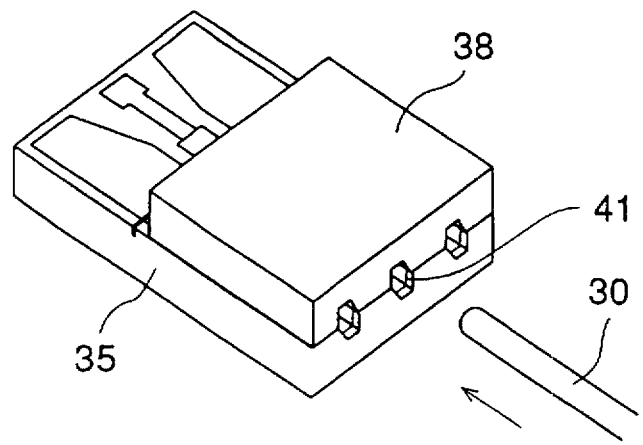

FIGS. 6A and 6B show an optical module in a third embodiment of the present invention. The optical module of the third embodiment provides a construction in which the optical fiber can automatically be positioned on the mounting board with the required level of accuracy.

As shown in FIG. 6A, an optical fiber stopper 36 and a laser-diode positioning mark (not shown) which are similar to those of the first and second embodiments are formed on a mounting board 35 (the silicon substrate). Similarly to the first and second embodiments, a V-groove 42 for enclosing the optical fiber 30 is formed in the middle of the mounting board 35. The V-groove 42 extends in the longitudinal direction of the mounting board 35.

Further, in the third embodiment, fitting grooves 37, each of which extends in a direction parallel to the longitudinal direction of the mounting board 35, are formed on the mounting board 35 at both sides of the V-groove 42. Cylindrical parts 40 (such as optical fibers) are inserted into the fitting grooves 37.

Further, in the third embodiment, a retaining board 38 (the silicon substrate) is provided to retain the cylindrical parts on the mounting board 35. A V-groove 42A corresponding to the V-groove 42 and fitting grooves 39 corresponding to the fitting grooves 37 are formed on the retaining board 38. The retaining board 38 is placed on the mounting board 35. The mounting board 35, the fitting grooves 37 and the retaining board 38 are fixed together via the cylindrical parts 40 by using an adhesive agent.

As shown in FIG. 6B, an insertion hole 41 to which the optical fiber 30 is inserted is formed by the V-groove 42 and the V-groove 42A.

The insertion hole 41 has an inside diameter slightly greater than an outside diameter of the optical fiber 30. For example, when the outside diameter of the optical fiber 30 is 125 μm, the inside diameter of the insertion hole 41 is 126 μm.

In the third embodiment, the optical fiber 30 is inserted into the insertion hole 41, and when the leading edge of the optical fiber 30 touches the stopper 36, the positioning of the optical fiber 30 on the mounting board 35 is automatically performed. The optical coupling of the optical fiber 30 and the laser-diode 28 is achieved with the required level of accuracy.

Since it is not necessary to handle many parts at the same time, performing the method of producing the optical module in the above-described third embodiment is very simple. The positioning of the optical fiber 30 on the mounting board 35 is automatically performed by inserting the optical fiber 30 and bringing it into contact with the stopper 36. The method of producing the optical module in the third embodiment is advantageous to realize volume production, low price and high reliability of the optical module.

In the above third embodiment, as shown in FIGS. 6A and 6B, two sets of the fitting grooves 37 and the fitting grooves 39 are provided. However, the present invention is not limited to this embodiment, and one fitting groove 37 and one fitting groove 39 may be provided, or three or more sets of the fitting grooves 37 and the fitting grooves 39 may be provided.

Figure 7A:
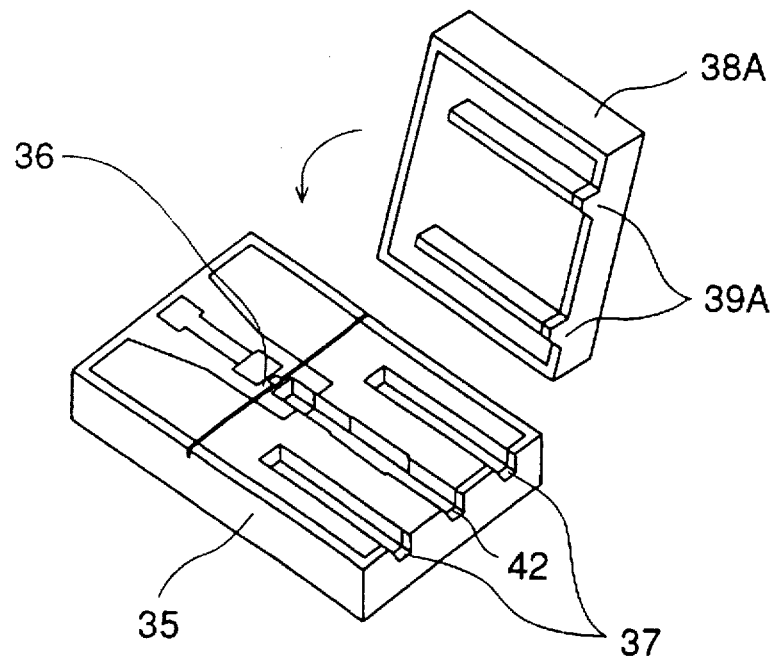
FIGS. 7A and 7B are diagrams of a modification of the optical module shown in FIGS. 6A and 6B.
Figure 7B:
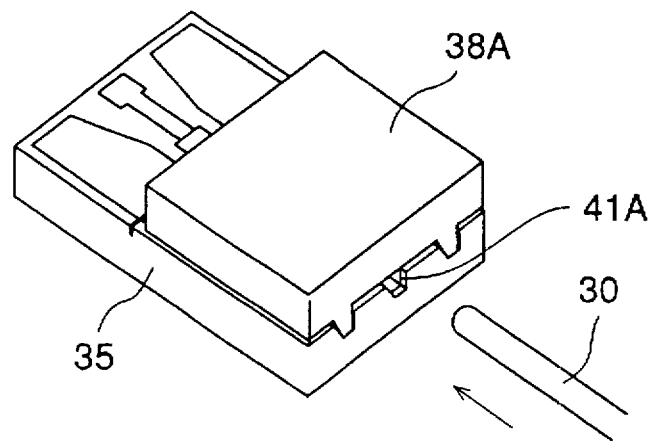

FIGS. 7A and 7B show a modification of the third embodiment.

As shown in FIG. 7A, instead of the retaining board 38 shown in FIGS. 6A and 6B, a retaining board 38A is provided in this embodiment. The retaining board 38A includes two fitting portions 39A corresponding to the fitting grooves 37 of the mounting board 35. The retaining board 38A includes no V-groove 42A corresponding to the V-groove 42 of the mounting board 35. The fitting portions 39A are fitted into the fitting grooves 37 of the mounting board 35, and the retaining board 38A and the mounting board 35 are fixed together by using an adhesive agent.

As shown in FIG. 7B, an insertion hole 41A to which the optical fiber 30 is inserted is formed by the V-groove 42 of the mounting board 35.

The insertion hole 41A has an inside diameter slightly greater than an outside diameter of the optical fiber 30. For example, when the outside diameter of the optical fiber 30 is 125 μm, the inside diameter of the insertion hole 41A is 126 μm.

In the present embodiment, shown in FIG. 7B, the top of the optical fiber 30 when inserted touches the flat bottom surface of the retaining board 38A. Since it is not necessary to handle many parts at the same time, performing the method of producing the optical module in the above-described embodiment is very simple. The positioning of the optical fiber 30 on the mounting board 35 is automatically performed by inserting the optical fiber 30 and bringing it into contact with the stopper 36. The method of producing the optical module in the present embodiment is advantageous to provide volume production, low price and high reliability of the optical module.

Figure 8A:
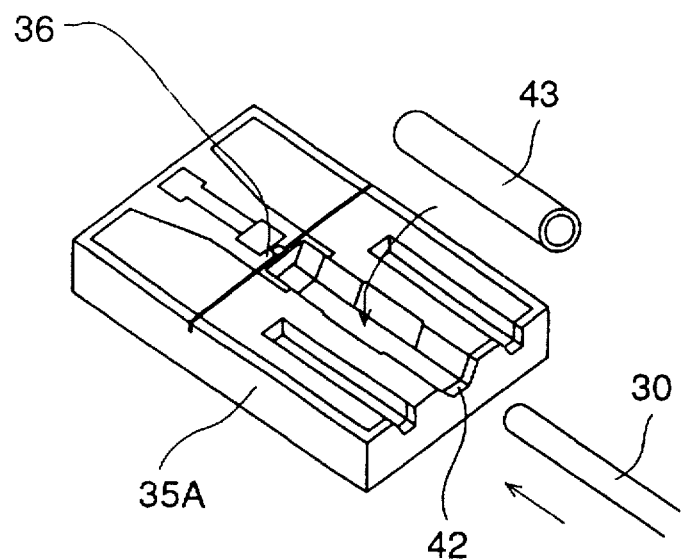
FIGS. 8A and 8B are diagrams of an optical module in a fourth embodiment of the present invention.
Figure 8B:
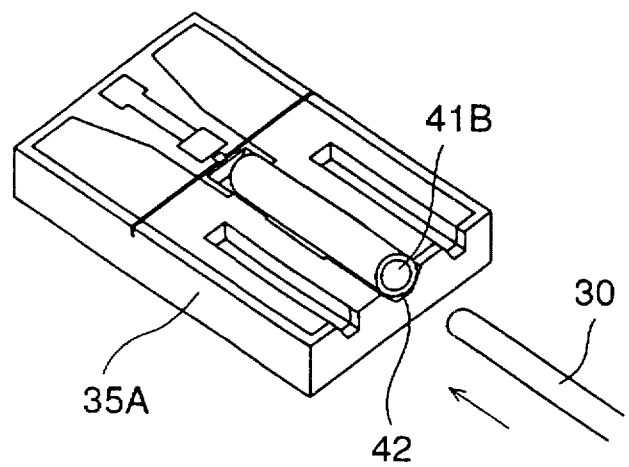

FIGS. 8A and 8B show an optical module in a fourth embodiment of the present invention. Similar to the above third embodiment, the optical module of the fourth embodiment has a construction in which the optical fiber can automatically be positioned on the mounting board with a required level of accuracy.

Referring to FIGS. 8A and 8B, the optical fiber stopper 36 and the laser-diode positioning mark (not shown) which are similar to those of the first and second embodiments are formed on a mounting board 35A (the silicon substrate). Similar to the third embodiment, the V-groove 42 for enclosing the optical fiber 30 is formed in the middle of the mounting board 35A. The V-groove 42 extends in the longitudinal direction of the mounting board 35A.

In the fourth embodiment, a glass capillary 43 is placed into the V-groove 42 on the mounting board 35A, and the glass capillary 43 and the mounting board 35A are fixed together by using an adhesive agent.

As shown in FIG. 8B, the glass capillary 43 has an insertion hole 41B to which the optical fiber 30 is inserted. The insertion hole 41B has an inside diameter slightly greater than the outside diameter of the optical fiber 30. The glass capillary 43 is produced with its outside and inside diameters having dimensions within a tolerance of ±1 μm. For example, when the outside diameter of the optical fiber 30 is 125 μm, the inside diameter of the insertion hole 41B of the glass capillary 43 is 126 μm.

In the fourth embodiment, the optical fiber 30 is inserted into the insertion hole 41B, and, when the leading edge of the optical fiber 30 touches the stopper 36, the positioning of the optical fiber 30 on the mounting board 35A is automatically performed. The method of producing the optical module in the present embodiment is advantageous to realize volume production, low price and high reliability of the optical module.

Further, in the fourth embodiment, a retaining board having a V-groove which is the same as the retaining board 38 of the third embodiment shown in FIGS. 6A and 6B may be provided. This retaining board and the mounting board 35A are fixed together via the glass capillary 43 by using an adhesive agent.

Figure 9A:
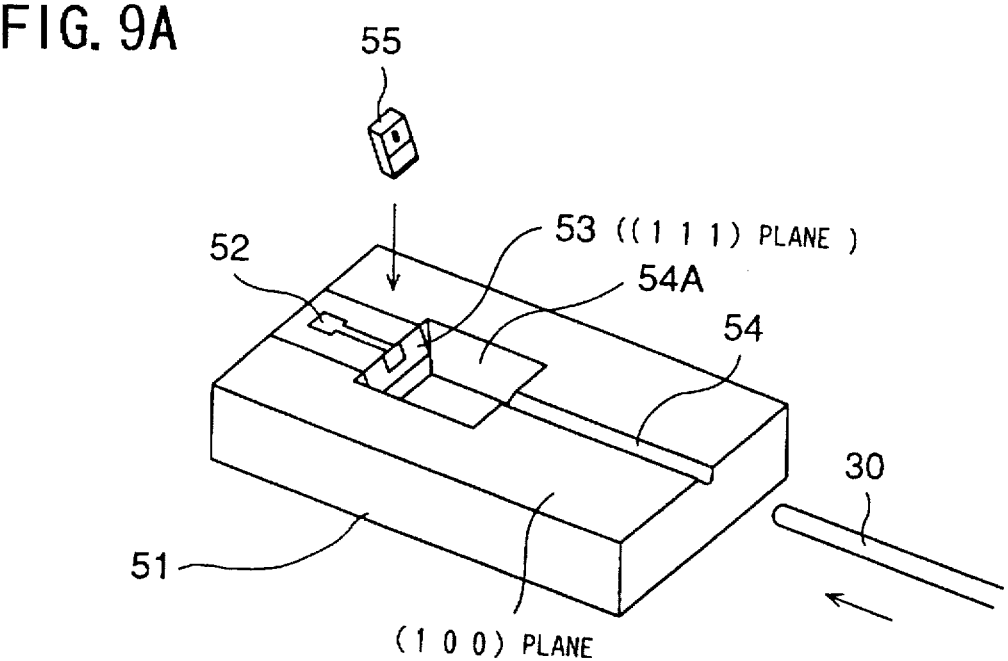
FIGS. 9A and 9B are diagrams of an optical module in a fifth embodiment of the present invention.
Figure 9B:
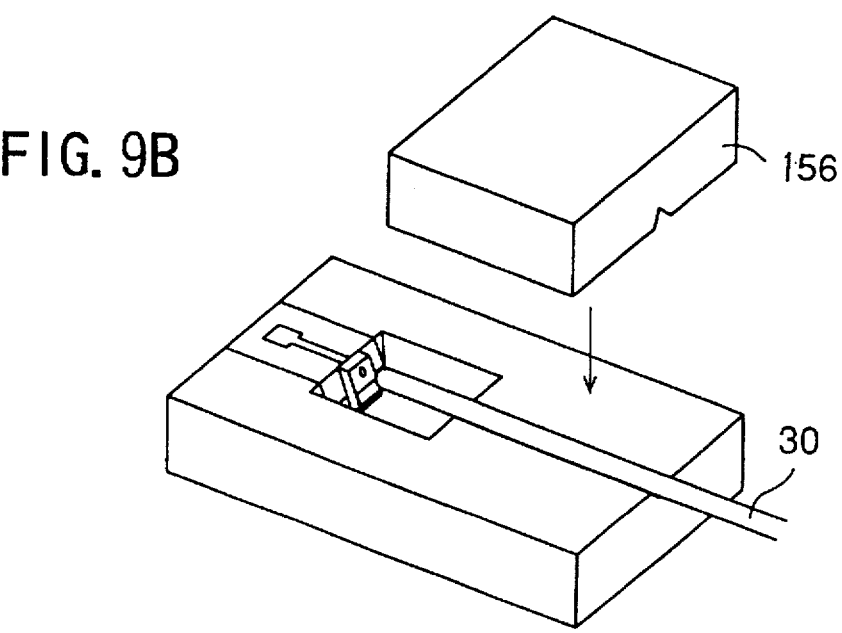

FIGS. 9A and 9B show an optical module in a fifth embodiment of the present invention. The optical module of the fifth embodiment provides a construction having a photo-diode as the optical element, which improves the coupling of the optical fiber and the photo-diode.

Referring to FIGS. 9A and 9B, a V-groove 54 for enclosing the optical fiber 30 is formed in the middle of a mounting board 51 (the silicon substrate). A recessed portion 54A for enclosing a photo-diode (PD) 55 is formed on the mounting board 51. The V-groove 54 and the recessed portion 54A are formed by etching of the mounting board 51 using the aqueous solution of potassium hydroxide (KOH). The recessed portion 54A has a sloping surface 53 which confronts the leading edge of the optical fiber 30 when inserted. This sloping surface 53 (which is identified as (111) plane of the silicon crystal structure) depends on the characteristics of the silicon crystal structure of the silicon substrate, and is at an angle of 54.74° to the horizontal surface (which is identified as (100) plane of the silicon crystal structure) of the silicon substrate.

The photo-diode (PD) 55 is mounted on the sloping surface 53 of the mounting board 51. Hereinafter, the sloping surface 53 is called the PD mounting surface. An electrode 52 is formed on an insulating layer (the $SiO_2$ film) of the mounting board 51, and extends from the PD mounting surface 53 in the longitudinal direction of the mounting board 51.

Figure 10:
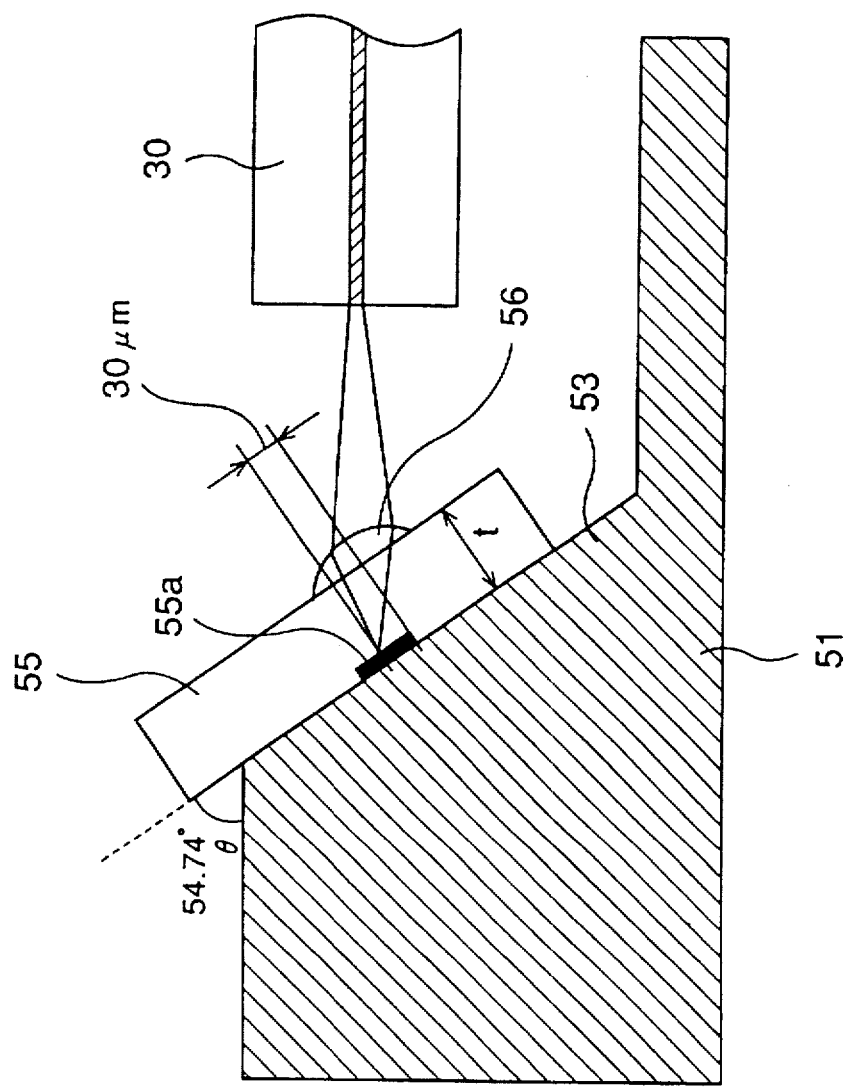
FIG. 10 is an enlarged cross-sectional view of the optical module of the fifth embodiment.

FIG. 10 is an enlarged view of the PD mounting surface 53 of the mounting board 51 shown in FIGS. 9A and 9B. As shown in FIG. 10, a light receiving surface 55a is formed at a portion of the bottom surface of the photo-diode 55, and a focusing lens 56 is provided at a portion of the top surface of the photo-diode 55. The focusing lens 56 functions to direct an incident light ray from the optical fiber 30 to the light receiving surface 55a of the photo-diode 55. Since the light receiving surface 55a is slanting to the direction of the optical axis of the optical fiber 30, the position of the focusing lens 56 downwardly deviates from the center of the light receiving surface 55a. There is a preset offset between the center of the light receiving surface 55a and the center of the focusing lens 56, as shown in FIG. 10. For example, the above offset is preset to 30 μm when the diameter of the light receiving surface 55a is 40 μm, the diameter of the focusing lens 56 is 80 μm, and the thickness "t" of the photo-diode 55 is 150 μm. For this reason, it is possible that the focusing lens 56 of the fifth embodiment correctly directs the light ray from the optical fiber 30 to the center of the light receiving surface 55a.

The photo-diode 55 is fixed to the PD mounting surface 53 of the mounting board 51 by soldering.

As shown in FIG. 9B, the optical fiber 30 is placed on the mounting board 51 and positioned thereon, and a retaining board 156 (the silicon substrate) is placed onto the mounting board 51 so that the optical fiber 30 is retained by the retaining board 156.

In the fifth embodiment, a photo-diode positioning mark (not shown) which is similar to the positioning mark 24 of the first embodiment is formed on the mounting board 51 along the edge of the recessed portion 54A. The positioning of the photo-diode 55 on the mounting board 51 can be performed while viewing this positioning mark. This makes it unnecessary to perform the adjusting of the optical axis of the optical fiber 30 in relation to the position of the photo-diode 55.

In the above fifth embodiment, it is not necessary to handle many parts at the same time, and the method of assembling the optical module in the present embodiment is very simple. The method of producing the optical module in the present embodiment is advantageous for volume production, low price and high reliability of the optical module.

The photo-diode 55 in the present embodiment is a type having the light receiving surface 55a on the bottom side of the photo-diode 55. However, a photo-diode of a type having the light receiving surface 55a on the front side may be used instead for the present embodiment.

FIGS. 11A through 11D show a photo-diode array module to which the fifth embodiment of the present invention is applied.

Figure 11A:
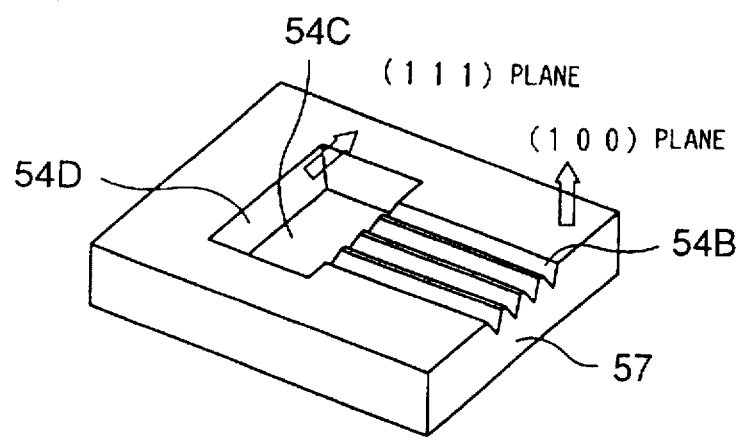
FIGS. 11A through 11D are diagrams of a photo-diode array module to which the fifth embodiment of the present invention is applied.

As shown in FIG. 11A, a plurality of V-grooves 54B and a recessed portion 54C are formed on a mounting board 57 (the silicon substrate) by etching. Sloping surfaces of the V-grooves 54B and a sloping surface 54D of the recessed portion 54C are formed by (111) plane of the silicon crystal structure which depend on the characteristics of the crystal structure of the silicon substrate. The top surface of the mounting board 57 is formed by (100) plane of the silicon crystal structure.

Figure 11B:
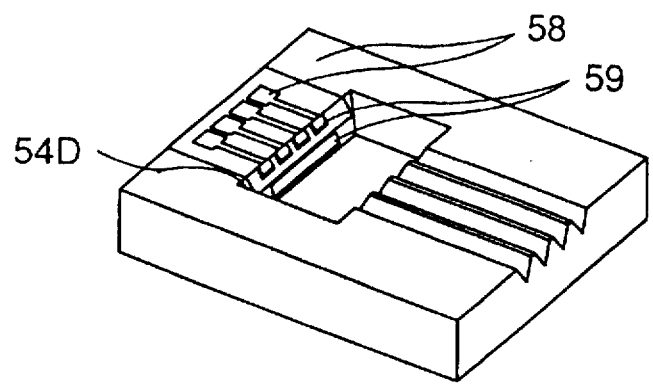

As shown in FIG. 11B, a plurality of electrodes 58 (Au) are formed on the mounting board 57. The electrodes 58 extend from the sloping surface 54D (the array mounting surface) of the recessed portion 54C. Further, a solder layer 59 is formed on the array mounting surface 54D.

Figure 11C:
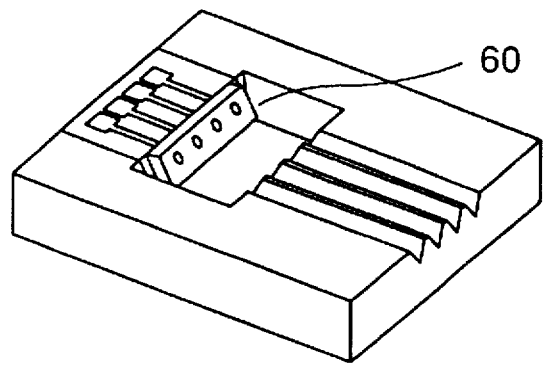

As shown in FIG. 11C, a photo-diode array 60, including a plurality of photo-diodes of the type having the light receiving surface on the bottom side, is placed on the solder layer 59. The photo-diode array 60 is fixed to the solder layer 59 on the array mounting surface 54D by soldering.

Figure 11D:
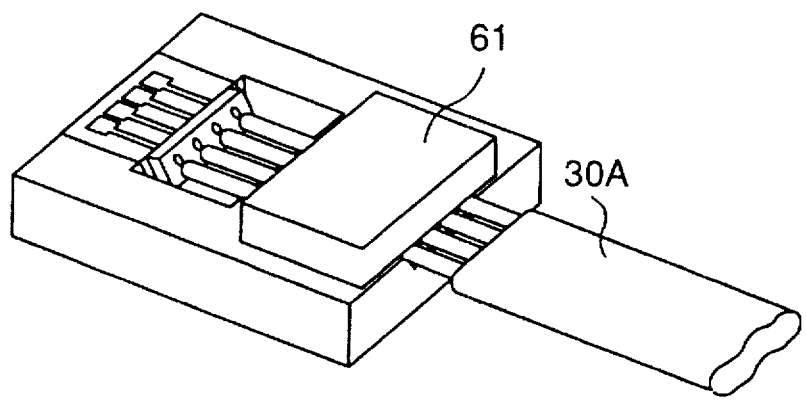

As shown in FIG. 11D, an optical fiber array 30A including a plurality of optical fibers is placed on the V-grooves 54B. A retaining board 61 (the silicon substrate) is placed on the optical fibers of the optical fiber array 30A, and the optical fibers are retained by the retaining board 61.

Figure 12:
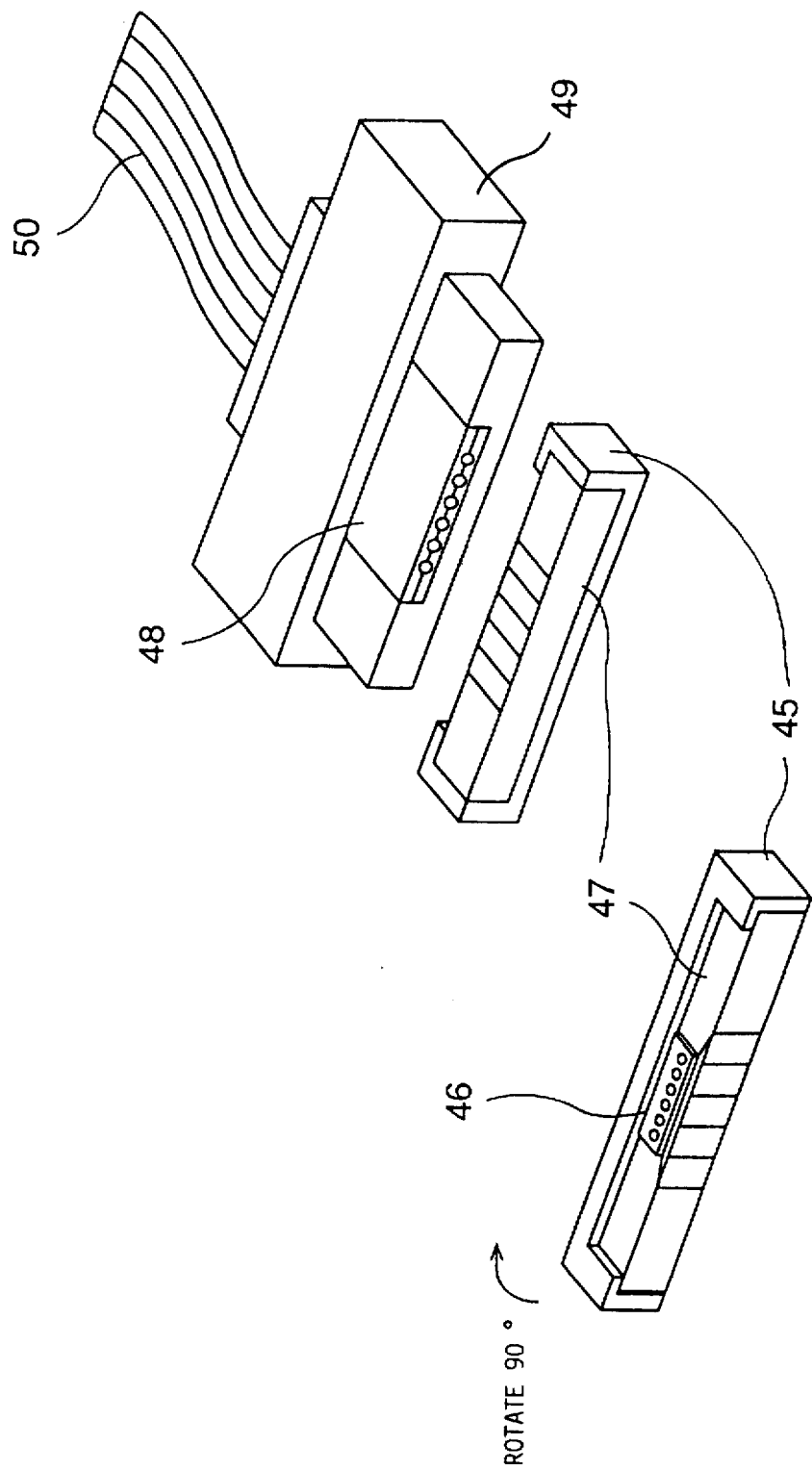
FIG. 12 is a diagram of a conventional photo-diode array module.

FIG. 12 shows a conventional photo-diode array module which is related to the above fifth embodiment. Referring to FIG. 12, a photo-diode array 46 including a plurality of photo-diodes of the type having the light receiving surface on the bottom side, is coupled to an optical fiber array 50 including a plurality of optical fibers. The photo-diode array 46 is packaged on a carrier 47, and the carrier 47 with the photo-diode array 46 is supported on a metal stem 45. The optical fiber array 50 has a ferrule 48 at its leading edge, and the optical fiber array 50 is supported on a metal frame 49. The photo-diode array 46 is fixed to the optical fiber array 50 after the adjusting of the optical axis of the optical fiber array 50 is performed.

In the above conventional photo-diode array module, it is necessary to handle many parts at the same time, and the method of assembling this conventional module is complicated. The method of producing the above conventional module is not appropriate for volume production, and the reliability of the conventional module is poor.

However, in the photo-diode array module of the above fifth embodiment, it is not necessary to handle many parts at the same time, and the method of assembling the optical module in the present embodiment is simple. The method of producing the optical module in the present embodiment is advantageous for volume production, low price and high reliability of the optical module.

FIGS. 13A through 13G show an optical module in a sixth embodiment of the present invention. It is desirable that the optical modules of the first through fifth embodiments described above are enclosed by a metal package (metal case).

In the sixth embodiment which will be described below, the optical module of the first embodiment is enclosed by a metal case. Also, the optical modules of the second through fifth embodiments may be enclosed by a metal case in a similar manner.

Figure 13A:
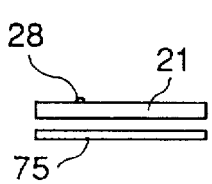
FIGS. 13A through 13G are diagrams for explaining a method of producing an optical module in a sixth embodiment of the present invention.
Figure 13G:
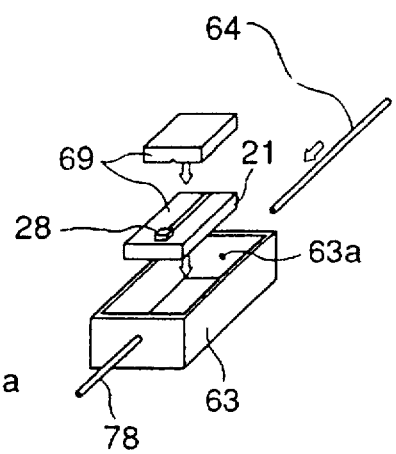
Figure 13B:
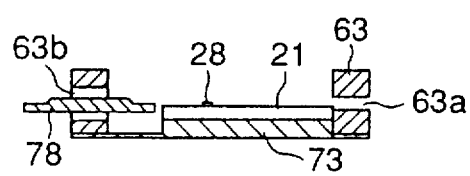

Referring to FIGS. 13A and 13B, the optical element 28 (the laser-diode in the first embodiment) is mounted on the mounting board 21 having the V-groove. The mounting board 21 with the optical element 28 is joined to a base 73 of a metal case 63 by using a solder sheet 75. The metal case 63 is made of, for example, aluminum (Al). The solder sheet 75 is inserted between the mounting board 21 and the base 73. During soldering of the solder sheet 75, the entire metal case 63 is heated while the mounting board 21 is loaded against the base 73 by a weight.

The metal case 63 includes an insertion hole 63a at one side and an insertion hole 63b at the opposite side. The optical fiber 30 is passed through the insertion hole 63a, and a signal-line drawing member 78 is passed through the insertion hole 63b.

Figure 13C:
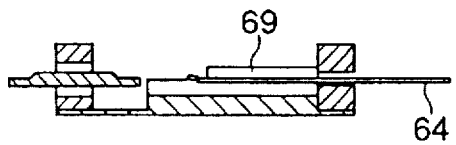

Referring to FIGS. 13C and 13G, an optical fiber cut-piece 64 is inserted in the metal case 63 through the insertion hole 63a. The optical fiber cut-piece 64 in the present embodiment is a piece of optical fiber having a small length with no protection coat. The optical fiber cut-piece 64 is retained by the retaining board 69 having the V-groove.

The metal case 63 in the present embodiment is made of Kovar. Kovar is a Fe—Co—Ni alloy including 54% iron (Fe), 17% cobalt (Co), and 29% nickel (Ni).

Figure 13D:
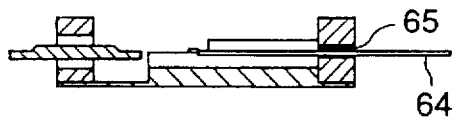

Referring to FIG. 13D, the insertion hole 63a of the metal case 63 is filled with a solder 65, and the optical fiber cut-piece 64 is fixed to the metal case 63 by soldering.

Figure 13E:
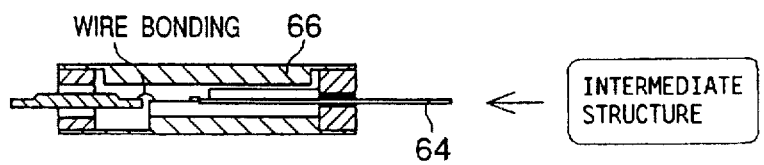

Referring to FIG. 13E, after a wire bonding for electrical connection is performed, a lid 66 (the material of which is the same as the material of the metal case 63) is placed on the metal case 63, and the inside of the metal case 63 is hermetically sealed by the lid 66.

The optical module shown in FIG. 13E may be a final state of the optical module. However, when taking into account the following production processes, the optical module of FIG. 13E may be called an intermediate structure.

Figure 13F:
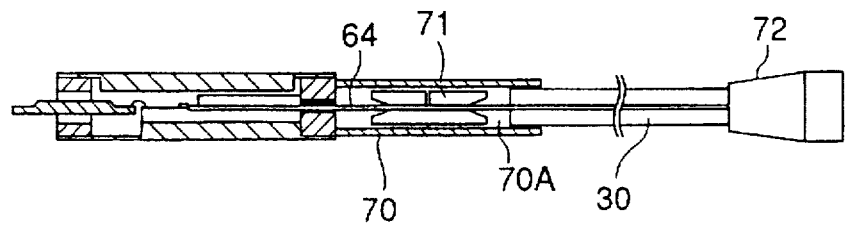

Referring to FIG. 13F, the optical fiber 30 with a connector 72 is attached to the intermediate structure. An insert holder 70 is attached to the metal case 63, so that the optical fiber cut-piece 64 and the optical fiber 30 with the connector 72 (provided in a guide groove 70A) are connected to each other by a glass capillary 71 (provided within the insert holder 70).

The optical fiber 30 in the previous embodiments is directly attached to the optical module. However, it is possible to use instead the final structure of the optical module shown in FIG. 13F.

When the method of producing the optical module in the sixth embodiment shown in FIGS. 13A through 13F is used, the adjustment of the optical axis of the optical fiber 30 to the optical element 28 is automatically performed when the optical fiber cut-piece 64 is fixed to the V-groove of the mounting board 21. It is no longer necessary to monitor the state of the coupling between the optical fiber and the optical element as required by the conventional production method.

In the above sixth embodiment, the use of the optical fiber cut-piece 64 makes the handling of the optical module easier than that when the optical fiber 30 is solely used, and the productivity of the optical module is improved. Further, in the above sixth embodiment, since the optical element 28 and the optical fiber 64 are packaged on the same mounting board 21, the number of the parts constituting the optical module is reduced. Accordingly, the optical module shown in FIGS. 13A through 13G is suitable for a method of production the optical module using automatic machines. The method of producing the optical module in the sixth embodiment is advantageous to provide volume production, low price and high reliability of the optical module.

In the case in which the optical element 28 is a laser-diode (LD), the optical module when operated tends to generate a certain degree of heat energy. The mounting board 21 on which the laser diode 28 is supported is fixed to the base 73 of the metal case 63. In the above sixth embodiment, a relatively large area where the laser diode 28 and the base 73 are in contact can be produced, and a heat passage large enough to discharge the heat generated by the optical module can be formed. By making the thickness of the base 73 of the metal case 63 small, it is possible to provide a small-thickness, small-size optical module.

Suppose that the optical modules of the third and fourth embodiments are enclosed by the metal case 63. In such a case, also, the positioning of the optical fiber can easily be performed by simply inserting the optical fiber cut-piece 64 into the insertion hole 63a. The method of producing the optical module in the sixth embodiment is advantageous to provide good productivity of the optical modules.

Figure 14:
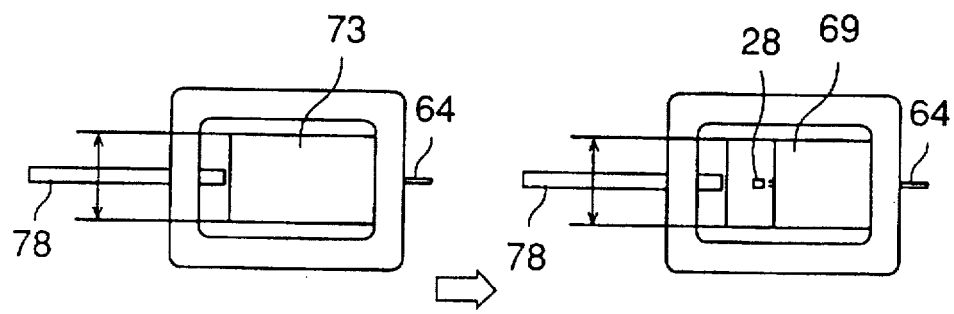
FIG. 14 is a top view of a modification of the optical module in the sixth embodiment.

FIG. 14 shows a modification of the optical module in the sixth embodiment. As shown in FIG. 14, it is desirable to make a lateral width of the base 73 of the metal case 63 equal to a lateral width of the mounting board 21, in order to facilitate the positioning of the mounting board 21 on the base 73 of the metal case 63. In this modification, if the mounting board 21 is positioned on the base 73 such that the side surfaces of the mounting board 21 and the side surfaces of the base 73 are flush with each other, the insertion hole 63a of the metal case 63 and the V-groove of the mounting board 21 accurately align with each other. Therefore, by this modification, it is possible to provide accurate positioning of the V-groove of the mounting board 21 to the insertion hole 63a of the metal case 63 without using a special positioning jig.

As described above, during the soldering of the solder sheet 75, the entire metal case 63 is heated while the mounting board 21 is loaded against the base 73 by the weight. By this soldering, an oxide film on the surface of the solder sheet 75 may be formed. If the oxide film is formed there, it is difficult to obtain an adequate level of the adhesion between the mounting board 21 and the base 73 by the soldering. To avoid the formation of the oxide film, it is desirable to vibrate or scrub either the mounting board 21 or the metal case 63 while the metal case 63 is heated. Hereinafter, this process is called the scrubbing process.

Figure 15A:
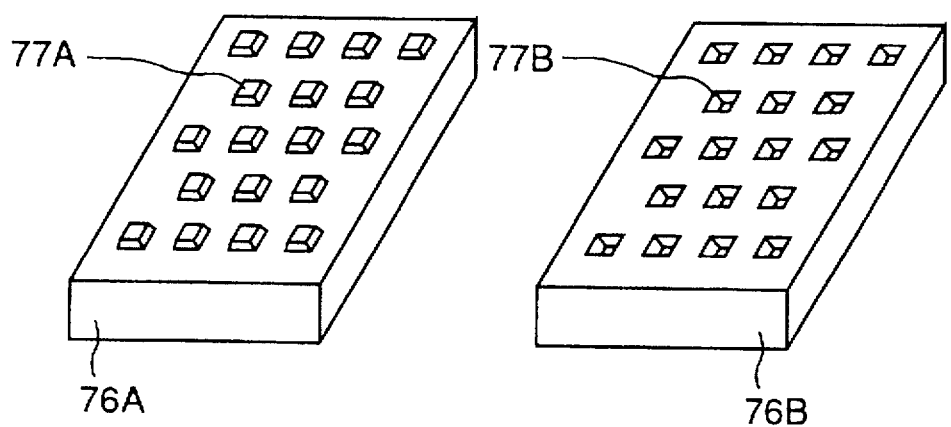
FIGS. 15A and 15B are diagrams showing an optical module in a seventh embodiment of the present invention.
Figure 15B:
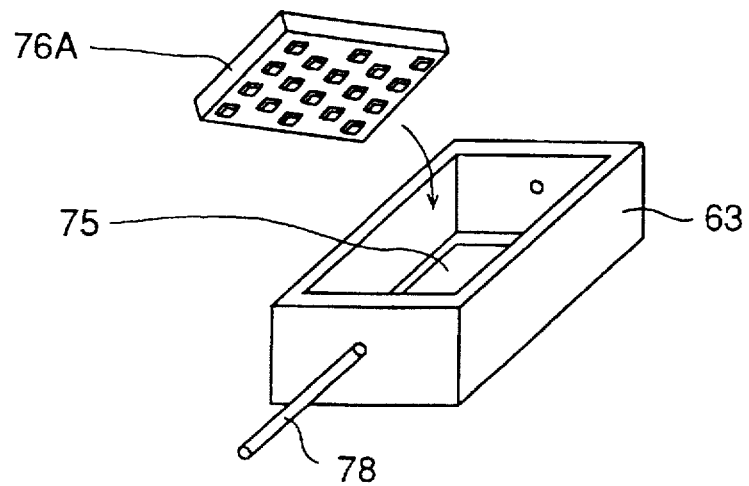

FIGS. 15A and 15B show an optical module in a seventh embodiment of the present invention. The optical module in the seventh embodiment makes it possible to obtain an adequate level of the adhesion without performing the above-mentioned scrubbing process.

As shown in FIG. 15A, the optical module in the present embodiment uses either a mounting board 76A (the silicon substrate) having a bottom on which an array of projections 77A is formed, or a mounting board (the silicon substrate) 76B having a bottom on which an array of recesses 77B are formed. The bottom of the mounting board 76A or the mounting board 76B is fixed to the base 73 of the metal case 63 via the solder sheet 75. The projections 77A or the recesses 77B can be formed on the silicon substrate by performing the etching using the aqueous solution of potassium hydroxide (KOH).

As shown in FIG. 15B, the mounting board 76A or the mounting board 76B described above is placed on the base 73 of the metal case 63 via the solder sheet 75. The entire metal case 63 is heated while the mounting board 21 is loaded against the base 73 by the weight, to perform the soldering of the solder sheet 75. During the above soldering, the projections 77A on the bottom of the mounting board 76A or the recesses 77B on the bottom of the mounting board 76B prevents the formation of the oxide film on the surface of the solder sheet 75. Therefore, it is possible to obtain an adequate level of the adhesion between the mounting board and the base 73 of the metal case 63 by the soldering. It is no longer necessary to perform the scrubbing process, and the method of producing the optical module can be made simple by the present embodiment.

Alternatively, it is possible that the above projections 77A or the above recesses 77B be formed on the base 73 of the metal sheet 63. In short, in the above seventh embodiment, the above projections 77A or the above recesses 77B may be formed on at least one of the bottom of the mounting board and the top of the base 73.

Since the optical fiber cut-piece 64 having no protection coat is used by the above sixth embodiment, the strength of this optical fiber against damage may not be sufficient. If the optical fiber cut-piece 64 is subjected to a bending stress before the intermediate structure shown in FIG. 13E is produced, the optical fiber cut-piece 64 is likely to be damaged or cut away. This problem can be eliminated if careful attention is paid to the handling of the optical fiber cut-piece 64 during the production.

Figure 16:
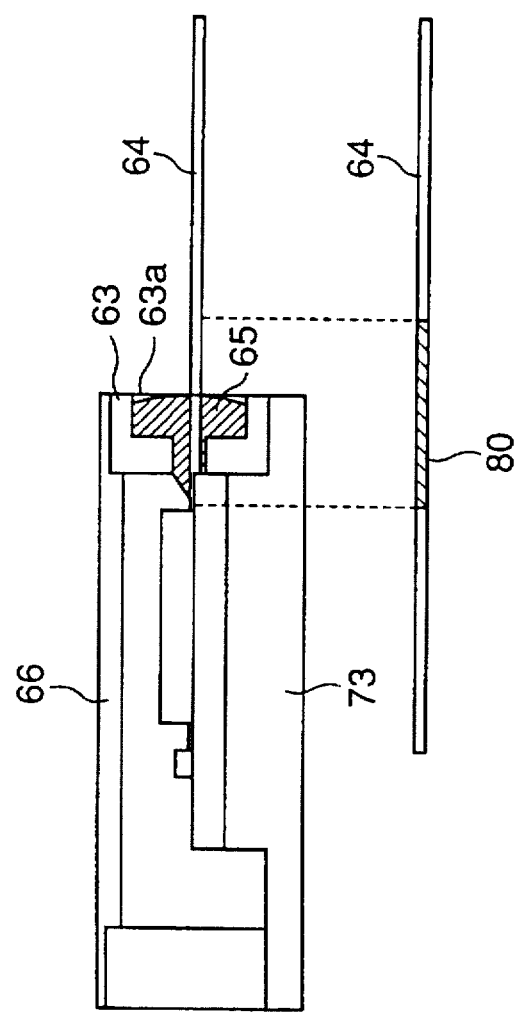
FIG. 16 is a diagram of an optical module in an eighth embodiment of the present invention.

FIG. 16 shows an optical module in an eighth embodiment of the present invention. The optical module in the eighth embodiment makes the above-mentioned handling of the optical fiber cut-piece 64 during the production easier.

Referring to FIG. 16, the optical fiber cut-piece 64 has a protection coat 80 located around a portion where the optical fiber cut-piece 64 and the insertion hole 63a of the metal case 63 join. Further, the optical fiber cut-piece 64 has a metal plating (not shown in FIG. 16) located at portions where the protection coat 80 is located and where the optical fiber cut-piece 64 and the V-groove of the mounting board 21 join. The protection coat 80 in this embodiment is made of any of carbon, polyimide, urethane, silicon, acrylic polymer, etc. The protection coat 80 is about 1 μm thick. The metal plating in this embodiment is deposited on the optical fiber cut-piece 64 by any of nickel (Ni) plating, gold (Au) electrolytic plating, and Ni—Cr/Cu sputtering. The metal plating is about 1 μm thick.

In the above eighth embodiment, the optical fiber cut-piece 64 has the metal plating at the portion where the cut-piece 64 is joined with the V-groove of the mounting board 21 with no protection coat located at this portion. The optical module of the present embodiment can provide an adequate level of accuracy of the optical fiber packaging for the portion where the optical fiber cut-piece 64 and the V-groove join. Further, in the above eighth embodiment, the optical fiber cut-piece 64 has the protection coat 80 around the portion where the insertion hole 63a and the optical fiber cut-piece 64 join. The strength of such a portion of the optical fiber cut-piece 64 against the bending stress can remarkably be increased by the protection coat 80.

Therefore, the optical module of this embodiment can make the above handling of the optical fiber cut-piece 64 during the production easier, and improves the productivity of the optical module.

As described above, in the optical module of the sixth embodiment as shown in FIGS. 13A through 13G and 14, if the mounting board 21 is positioned on the base 73 such that the side surfaces of the mounting board 21 and the side surfaces of the base 73 are flush with each other, the insertion hole 63a of the metal case 63 and the V-groove of the mounting board 21 accurately accord with each other on a horizontal plane. However, as a practical problem, if a lower level of accuracy of the positioning of the optical axis of the optical fiber to the V-groove of the mounting board 21 can be allowed, the ease of production of the optical module will be further increased.

Figure 17A:
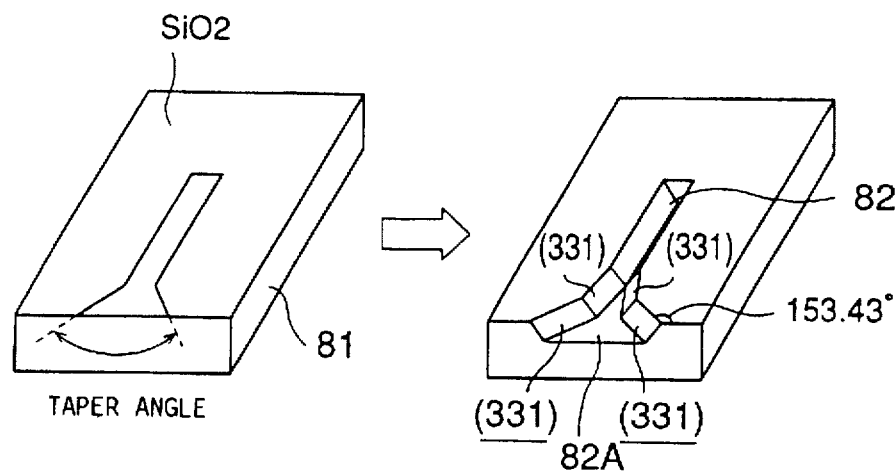
FIGS. 17A, 17B and 17C are diagrams of an optical module in a ninth embodiment of the present invention.
Figure 17B:
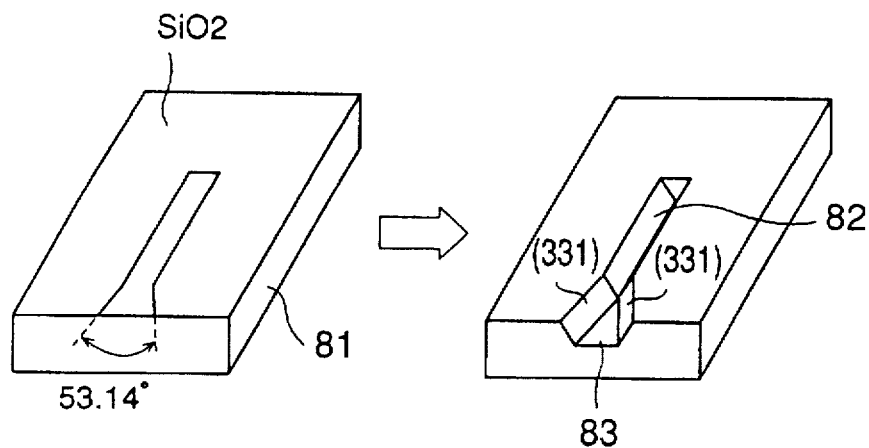
Figure 17C:
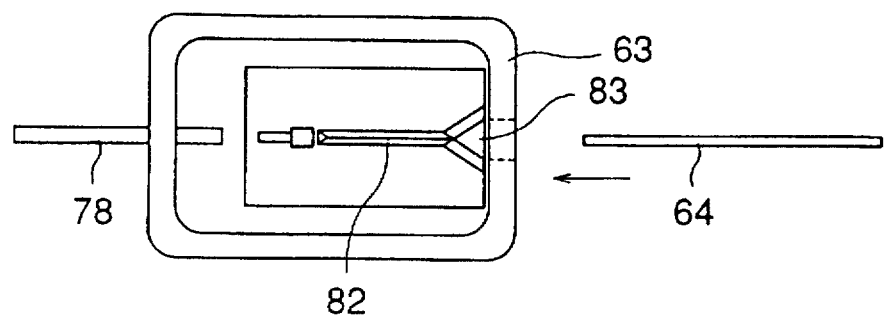

FIGS. 17A, 17B and 17C show an optical module in a ninth embodiment of the present invention. The optical module in this embodiment allows a lower level of accuracy for positioning of the optical axis of the optical fiber to the V-groove of the mounting board to be performed.

As shown in FIG. 17A, a front edge of a V-groove 82 of a mounting board 81 (the silicon substrate) is tapered. This front edge of the V-groove 82 is located at a side of the mounting board 81 confronting the leading edge of the optical fiber cut-piece 64 when it is inserted through the insertion hole 63a of the metal case 63. A tapered portion 82A at the front edge of the V-groove 82 is formed such that the tapered portion 82A has an arbitrary taper angle. This tapered portion 82A includes sloping surfaces ((331) plane of the silicon crystal structure) and sloping surfaces ((331) plane of the silicon crystal structure), as shown in FIG. 17A. The sloping surface (the (331) plane) and the sloping surfaces (the (331) plane) depend on the characteristics of the silicon crystal structure of the silicon substrate. Since the optical module of the present embodiment includes the tapered portion 82A of the V-groove 82 which facilitates the insertion of the optical fiber cut-piece 64, a lower level of accuracy for positioning of the optical axis of the optical fiber to the V-groove of the mounting board is allowed.

However, the sloping surfaces (the (331) plane) of the tapered portion 82A have a taper angle of 153.43° as shown in FIG. 17A, and this taper angle is relatively great. For this reason, the leading edge of the optical fiber cut-piece 64 when inserted may hit the sloping surfaces (the (331) plane), causing a problem on the production of the optical module.

In order to avoid the above-mentioned problem, it is desirable to use a tapered portion 83 of the V-groove 82 shown in FIGS. 17B and 17C. The sloping surfaces (331) of the tapered portion 83 have a taper angle of 53.14°, and this taper angle is relatively small. For this reason, the leading edge of the optical fiber cut-piece 64 can smoothly be inserted in the V-groove 82 even if the leading edge touches the tapered portion 83.

In the present embodiment, the formation of the sloping surfaces (the (331) plane) of the tapered portion is avoided by making the tapered portion having a taper angle of 53.14° or below.

In the optical module of the sixth embodiment shown in FIGS. 13A through 14, the insertion hole 63a of the metal case 63 is filled with the solder 65, for sealing the metal case 63, after the optical fiber cut-piece 64 is passed through the insertion hole 63a. In order to perform the soldering suitably, the diameter of the insertion hole 63a should not be made too large.

Further, in the optical module of the sixth embodiment, the mounting board 21 is packaged within the metal case 63.

In order to prevent the optical fiber cut-piece 64 from interfering with the mounting board 21 when the optical fiber cut-piece 64 is inserted in the V-groove 82, it is necessary to slightly raise the optical fiber cut-piece 64 above the mounting board 21 when inserted. For this reason, a range of the insertion hole 63a in which the optical fiber cut-piece 64 can smoothly be passed is somewhat narrow, and a high level of accuracy for the positioning is needed.

However, as a practical problem, if a lower level of accuracy for positioning of the optical axis of the optical fiber to the V-groove of the mounting board 21 can be allowed, the ease of production of the optical module will be further increased.

FIGS. 18A through 18F show an optical module in a tenth embodiment of the present invention. The optical module in the tenth embodiment allows a lower level of accuracy for positioning of the optical axis of the optical fiber to the V-groove of the mounting board with respect to a vertical plane to be performed.

Figure 18C:
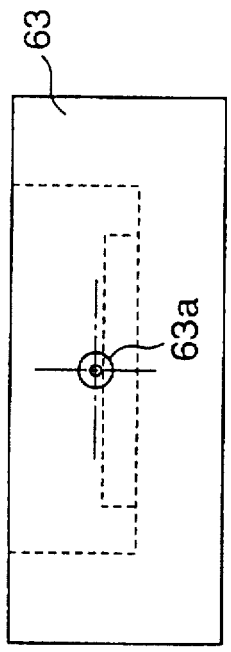
FIGS. 18A through 18F are views of an optical module in a tenth embodiment of the present invention.
Figure 18E:
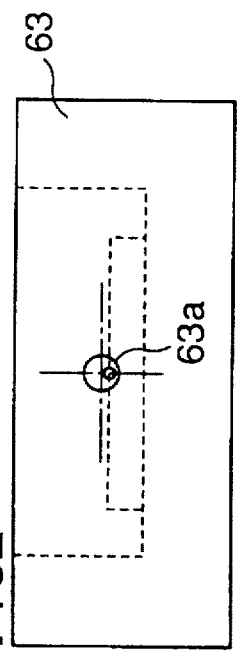
Figure 18F:
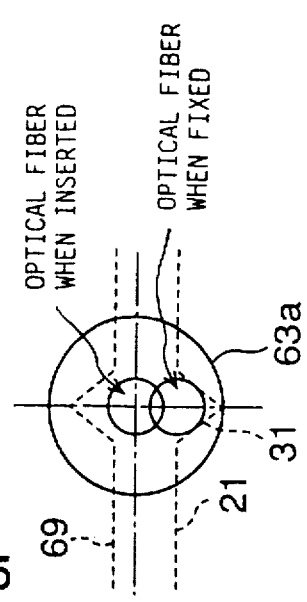
Figure 18A:
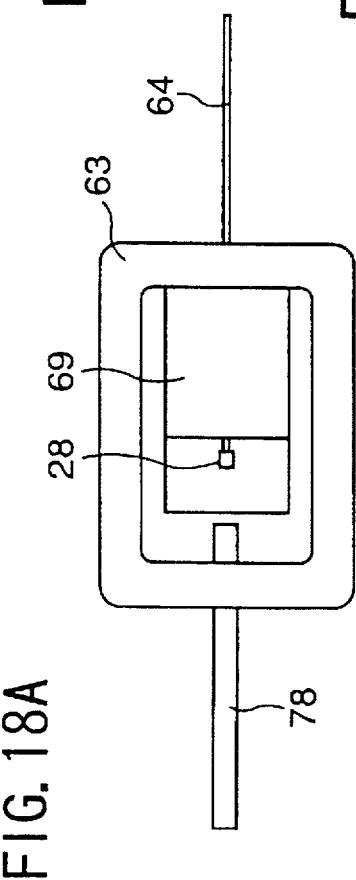
Figure 18B:
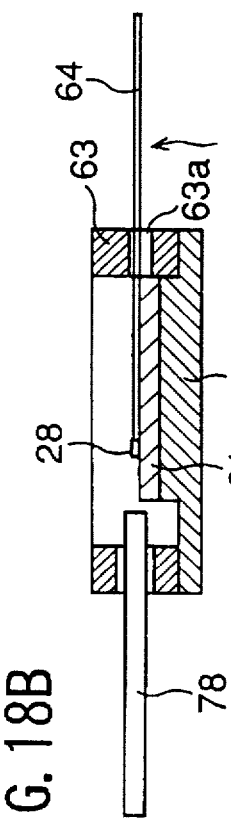
Figure 18D:
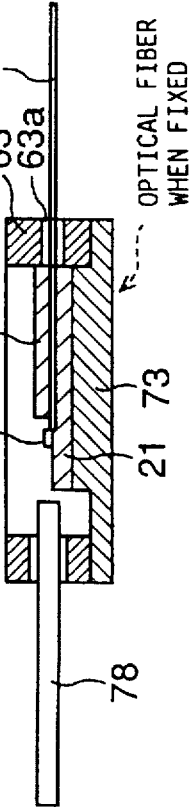

FIG. 18A is a top view of the optical module of the tenth embodiment, FIG. 18B is a cross-sectional view of this optical module (when the optical fiber is inserted), taken along the optical axis of the optical fiber, FIG. 18D is a cross-sectional view of this optical module (when the optical fiber is fixed) taken along the optical axis of the optical fiber, FIGS. 18C and 18E are side views of this optical module where the insertion hole 63a is provided (corresponding to FIGS. 18B and 18D respectively), and FIG. 18F is an enlarged view of the optical module in FIG. 18E.

As shown in FIGS. 18A through 18F, in the optical module of the tenth embodiment, the center of the optical fiber cut-piece 64 when it is placed on the V-groove 31 of the mounting board 21 deviates from the center of the insertion hole 63a of the metal case 63. The insertion hole 63a of the metal case 63 is formed such that the center of the optical fiber cut-piece 64 when placed on the V-groove 31 of the mounting board 21 is located below the center of the insertion hole 63a. When the optical fiber cut-piece 64 is fixed to the mounting board 21 by the soldering, the optical fiber cut-piece 64 in the fixed state does not touch the inside periphery of the insertion hole 63a, as shown.

In the above tenth embodiment, when the optical fiber cut-piece 64 is inserted, the center of the optical fiber cut-piece 64 is slightly raised above the mounting board 21. Thus, at this time, the center of the optical fiber cut-piece 64 and the center of the insertion hole 63a can be aligned with each other. After the optical fiber cut-piece 64 is fixed to the mounting board 21, the center of the optical fiber cut-piece 64 is located below the center of the insertion hole 63a. However, the optical fiber cut-piece 64 when fixed does not touch the inside periphery of the insertion hole 63a.

Accordingly, since the insertion of the optical fiber cut-piece 64 to the mounting board 21 at a height of the center of the insertion hole 63a can be smoothly performed, a lower level of accuracy for positioning of the optical axis to the V-groove 31 of the mounting board 21 with respect to a vertical plane is allowed by the above tenth embodiment.

In the optical module of the sixth embodiment shown in FIGS. 13A through 14, it is desirable to monitor a soldering condition after the optical fiber cut-piece 64 is fixed to the metal case 63 by soldering of the solder in the insertion hole 63a of the metal case 63. This monitoring of the soldering condition is performed by viewing the insertion hole 63a from the outside of the metal case 63. However, if the monitoring of the soldering condition can be performed by viewing the insertion hole 63a from the inside of the metal case 63, it is advantageous to improve the yield of the thus produced optical modules.

FIGS. 19A and 19B show an optical module in an eleventh embodiment of the present invention. The optical module in the eleventh embodiment allows the monitoring of the soldering condition to be performed by viewing the insertion hole 63a from the inside of the metal case 63.

As shown in FIG. 19A, the retaining board 69 in the present embodiment is located apart from an inside wall of the metal case 63 where the insertion hole 63a is provided. When the soldering is performed, the solder from the insertion hole 63a is spread over a space between the retaining board 69 and the inside wall of the metal case 63, as indicated by an arrow "A" in FIG. 19A. Thus, it is possible to monitor the soldering condition by viewing the insertion hole 63a from the inside of the metal case 63.

As shown in FIG. 19B, both the retaining board 69 and the mounting board 21 in the present embodiment are located apart from the inside wall of the metal case 63 where the insertion hole 63a is provided. Also, in the present embodiment, when the soldering is performed, the solder from the insertion hole 63a is spread over the space between the mounting board 21 and the inside wall of the metal case 63, as indicated by an arrow in FIG. 19B. Thus, it is possible to monitor the soldering condition by viewing the insertion hole 63a from the inside of the metal case 63.

In the eleventh embodiment as shown in FIGS. 19A and 19B, it is necessary that both the retaining board 69 and the mounting board 21 include a V-groove which is long enough to position the optical fiber cut-piece 64 on the mounting board 21.

In the above eleventh embodiment, since the soldering condition can be monitored by viewing the insertion hole 63a from the inside of the metal case 63, it is possible to improve the yield of the produced optical modules.

FIGS. 20A and 20B show a soldering process of the optical module in the eleventh embodiment in FIGS. 19A and 19B. A soldering process shown in FIG. 13D is the same as the soldering process shown in FIGS. 20A and 20B.

As shown in FIG. 20A, the signal-line drawing member 78 is inserted in a hot plate 85, and the metal case 73 is vertically supported on the hot plate 85. A solder preform 86, which is a solder of a hollow, cylindrical form, is provided at a predetermined portion of the optical fiber cut-piece 64, and the optical fiber cut-piece 64 is placed on a side wall of the metal case 63. In FIGS. 20A and 20B, the side wall of the metal case 63 is horizontally provided. The metal case 63 is heated by using the hot plate 85 when the optical module is in the condition shown in FIG. 20A, so that the solder preform 86 is melted by the heat.

As shown in FIG. 20B, since the solder preform 86 is melted by the above soldering, the solder is spread out at the external portions of the insertion hole 63a of the metal case 63, and the solder finally solidifies, as indicated by an arrow "B" in FIG. 20B.

In the optical module of the eleventh embodiment shown in FIGS. 20A and 20B, the flatness of the external side wall of the metal case 63 becomes poor due to the spread-out solder. If the flatness of the external side wall of the metal case 63 is poor, the optical module having such a metal case may experience a difficulty in attaching the insert holder 70 to the metal case 63 as shown in FIG. 13F.

FIGS. 21A and 21B show an optical module in a twelfth embodiment of the present invention. The optical module of the twelfth embodiment eliminates the problem of the poor flatness of the external side wall of the metal case 63 in the eleventh embodiment.

Referring to FIG. 21A, the metal case 63 has a recessed portion 63b provided at the side wall of the metal case 63. The recessed portion 63b has a tapered surface merging with the insertion hole 63a. The recessed portion 63b has a diameter greater than the diameter of the insertion hole 63a. The solder preform 86 is provided at the predetermined portion of the optical fiber cut-piece 64, and the optical fiber cut-piece 64 is inserted in the mounting board 21 with the solder preform 86 on the side wall of the metal case 63. The metal case 63 is heated, so that the solder preform 86 is melted within the tapered portion 63b. It is possible to prevent the solder in the melted state from being spread out to the external side wall of the metal case 63.

Referring to FIG. 21B, the metal case 63 has a recessed portion 63c provided at the side wall of the metal case 63, instead of the tapered portion 63b. The recessed portion 63c includes a stepped surface having a rectangular cross-section. In this embodiment, solder grains 88 are used instead of the solder preform 86, and the solder grains 88 are placed in the recessed portion 63c. Similarly to the above embodiment of FIG. 21A, it is possible to prevent the solder in the melted state from being spread out to the external side wall of the metal case 63.

In the above twelfth embodiment, the flatness of the external side wall of the metal case 63 can be maintained, and no problem will be caused when attaching the insert holder 70 to the metal case 63 as shown in FIG. 13F.

Figures 22A, 22B, 22C:
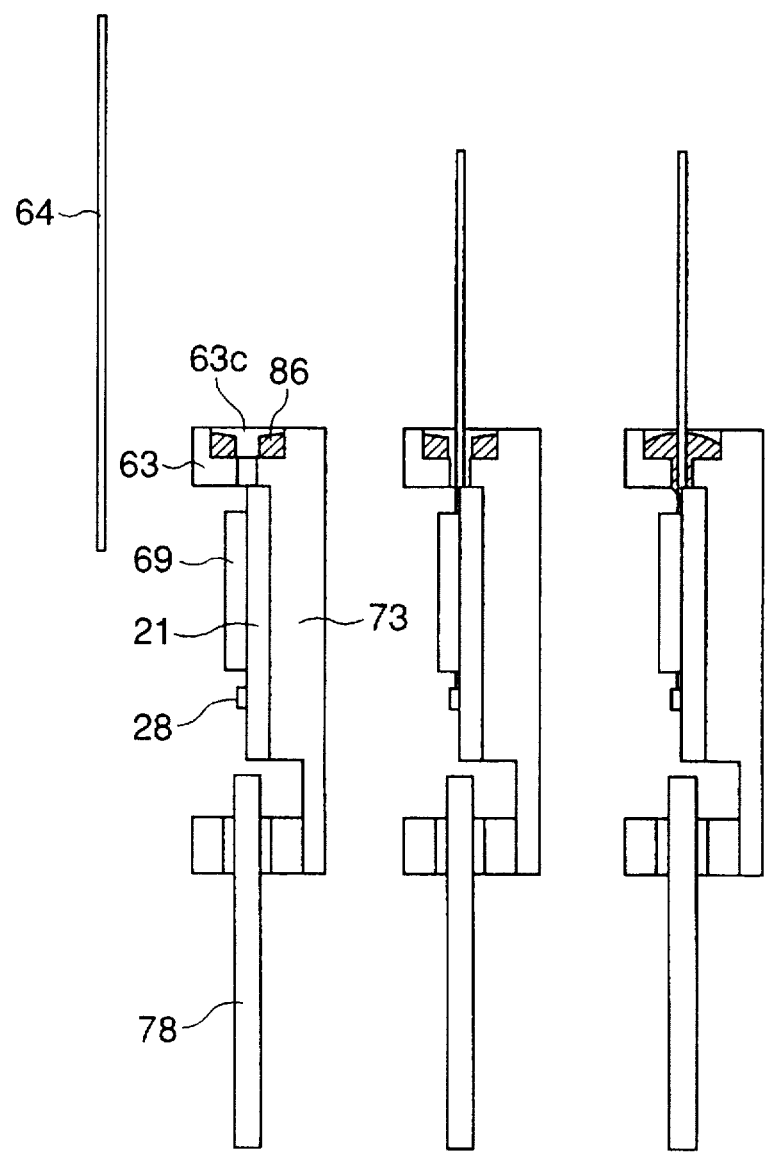
FIGS. 22A, 22B and 22C are diagrams of a modification of the optical module of the twelfth embodiment.

FIGS. 22A, 22B and 22C show a modification of the twelfth embodiment in FIGS. 21A and 21B. As shown in FIG. 22A, before the optical fiber cut-piece 64 is inserted in the mounting board 21, the solder preform 86 (FIG. 21A) is fixed to the stepped surface of the recessed portion 63c (FIG. 21B). As shown in FIG. 22B, the optical fiber cut-piece 64 is placed into the V-groove of the mounting board 21 through the hole of the solder preform 86. As shown in FIG. 22C, the metal case 63 is heated to melt the solder preform 86, and the optical fiber cut-piece 64 is fixed to the insertion hole 63a by the soldering. In this embodiment, the fixing of the optical fiber to the metal case and the soldering to enclose the mounting board 21 are carried out at the same time. The present embodiment is advantageous to improve the productivity of the optical module.

FIG. 23 shows a modification of the above embodiment of FIGS. 22A, 22B and 22C. This embodiment provides a method of fixing the solder preform 86 to the tapered portion 63c of the metal case 63. As shown in FIG. 23, the solder preform 86 is placed on the stepped surface of the recessed portion 63c, and the solder preform 86 is hit by using a punch 90 so that the solder preform 86 is fixed to the recessed portion 63c.

Figure 24A:
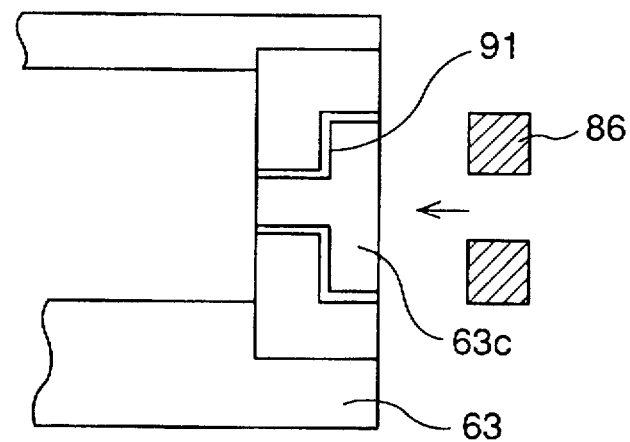
FIGS. 24A, 24B and 24C are diagrams of a modification of the embodiment of FIGS. 22A, 22B and 22C to improve the adhesion and stability of the soldering.
Figure 24B:
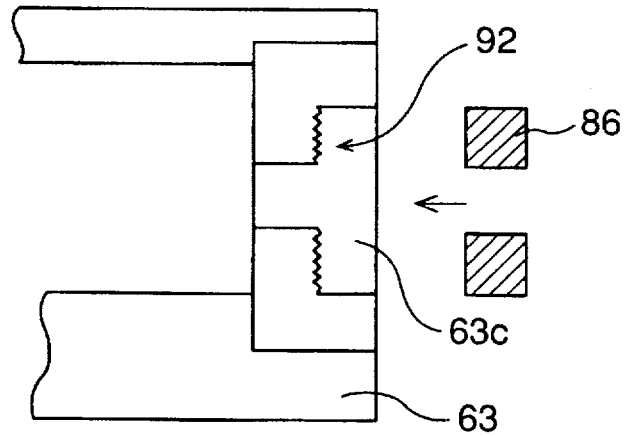
Figure 24C:
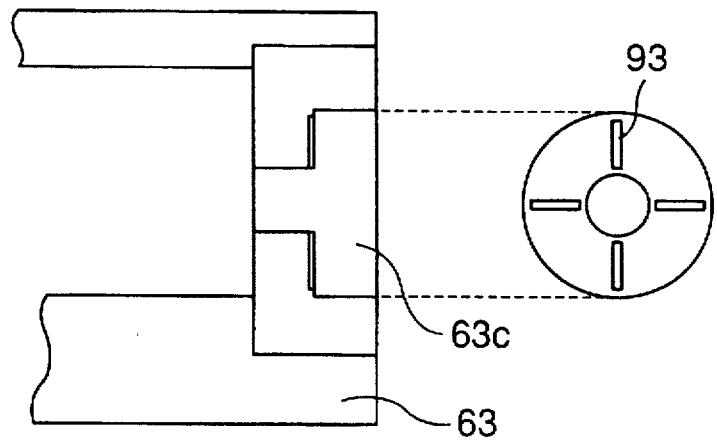

FIGS. 24A, 24B and 24C show a modification of the above embodiment of FIGS. 22A, 22B and 22C to improve the adhesion and stability of the soldering.

Referring to FIG. 24A, the recessed portion 63c has a metal plating layer 91 on the entire surface of the recessed portion 63c. The metal plating layer 91 in this embodiment is deposited on the side wall of the metal case 63 by one of nickel (Ni) plating (2–5 μm thick) and gold (Au) flush plating (0.2 μm thick). A nickel (Ni) plating is deposited on the other surface of the metal case 63 different from the recessed portion 63c. By this modification, the spreading of the solder from the recessed portion 63c to the outside of the metal case 63 is safely prevented, and the adhesion and stability of the soldering is improved.

Referring to FIG. 24B, the recessed portion 63c has a roughed surface 92 on the side wall thereof. This roughed surface 92 is formed by a milling cutter. By this modification, the adhesion and stability of the soldering is improved. As shown in FIG. 24B, the solder preform 86 is placed on this roughed surface 92 of the recessed portion 63c, and the solder preform 86 is hit by using the punch 90 (FIG. 23) so that the solder preform 86 is firmly fixed to the recessed portion 63c.

Referring to FIG. 24C, the recessed portion 63c has a number of grooves 93 provided on the side wall of the recessed portion 63c. The grooves 93 radially extend from the center of the insertion hole 63a as shown. By this modification, the adhesion and stability of the soldering is improved. In FIG. 24C, the solder preform 86 (not shown) is placed on the recessed portion 63c, and the solder preform 86 is hit by using the punch 90 (FIG. 23) so that the solder preform 86 is firmly fixed to the recessed portion 63c.

In the above embodiments of FIGS. 23 through 24C, the metal case 63 has the recessed portion 63c (FIG. 21B) with the stepped surface having a rectangular cross-section. However, the above embodiments of FIGS. 23 through 24C may also be applied to the metal case 63 having the recessed portion 63b (FIG. 21A) with the tapered surface.

Figures 25A, 25B, 25C:
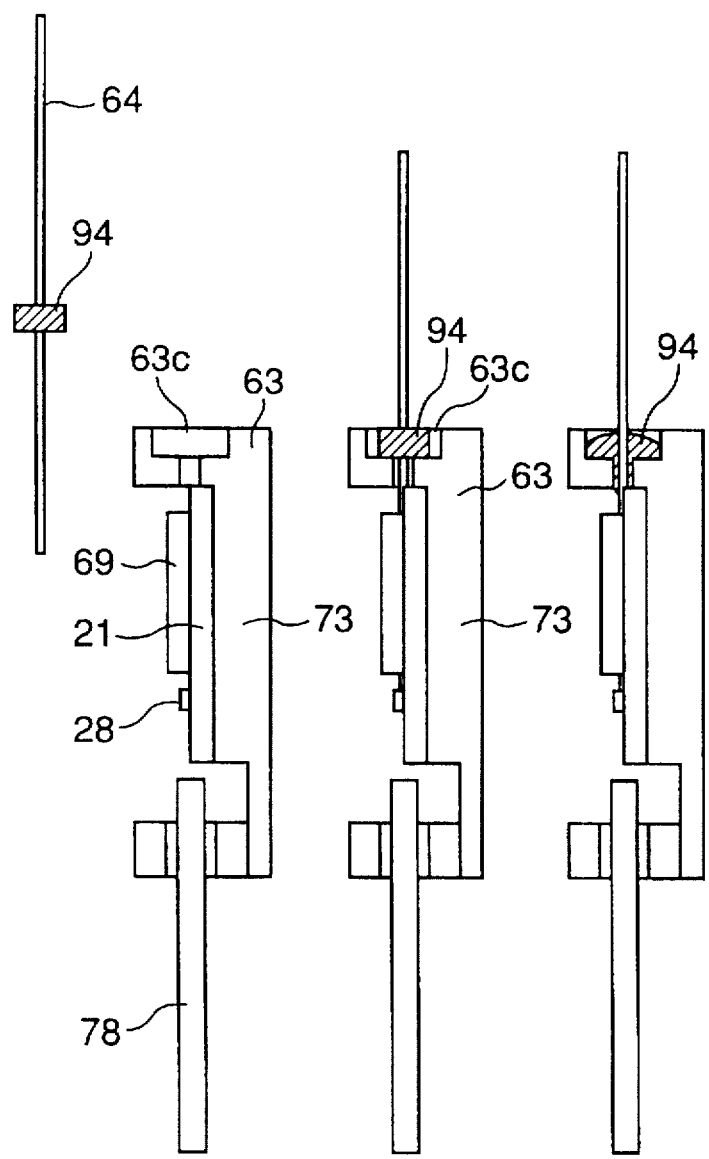
FIGS. 25A, 25B and 25C are diagrams of an optical module in a thirteenth embodiment of the present invention.

FIGS. 25A, 25B and 25C show an optical module in a thirteenth embodiment of the present invention. The present embodiment provides another method of fixing the optical fiber cut-piece 64 to the metal case 63.

As shown in FIG. 25A, a solder piece 94 is fixed to the predetermined portion of the optical fiber cut-piece 64. As shown in FIG. 25B, the optical fiber cut-piece 64 is inserted in the insertion hole at the recessed portion 63c of the metal case 63. As shown in FIG. 25C, the entire metal case 63 is heated so that the solder piece 94 is melted by the heat. The method of fixing the optical fiber cut-piece 64 in the present embodiment allows a reduction of the number of parts needed for the soldering during the assembly. The previous fixing process to fix the solder preform 86 to the metal case 63 by using the punch 90 is no longer needed, and the method of fixing the optical fiber cut-piece 64 in this embodiment provides a more simple fixing process.

If the positioning of the solder piece 94 on the optical fiber cut-piece 64 in the present embodiment is performed with a high level of accuracy, it is possible to use the solder piece 94 as the stopper to position the optical fiber cut-piece 64 on the mounting board 21.

FIGS. 26A through 26G show a method of producing the optical module in the thirteenth embodiment in FIGS. 25A, 25B and 25C. In FIGS. 26A through 26G, the parts which are the same as corresponding parts in FIGS. 13A through 13G are designated by the same reference numerals.

Figure 26A:
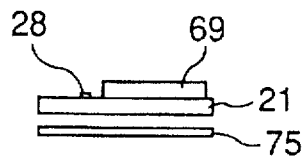
FIGS. 26A through 26G are diagrams for explaining a method of producing the optical module shown in FIGS. 25A, 25B and 25C.
Figure 26B:
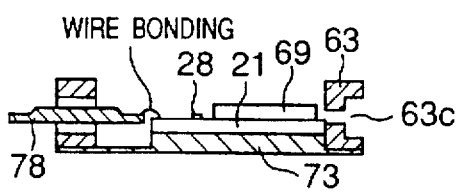
Figure 26G:
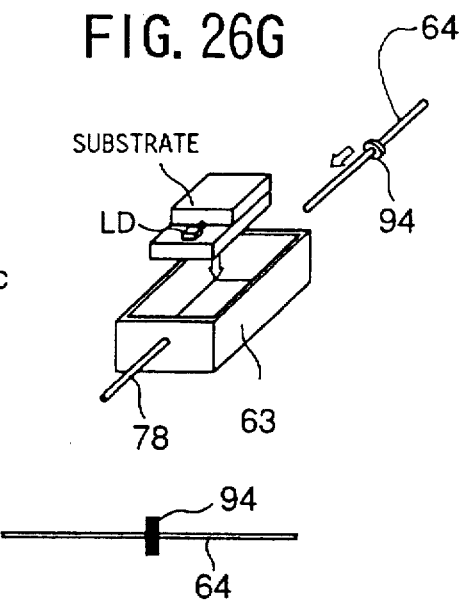

In the present embodiment, as shown in FIGS. 26B and 26G, before the optical fiber cut-piece 64 is inserted in the mounting board 21, the retaining board 69 is mounted on the mounting board 21, and the wire bonding for the electrical connection is performed.

Figure 26C:
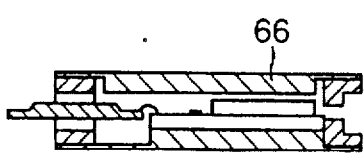
Figure 26D:
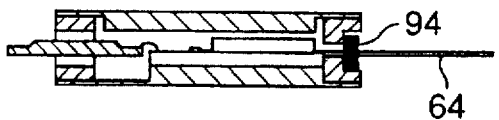
Figure 26E:
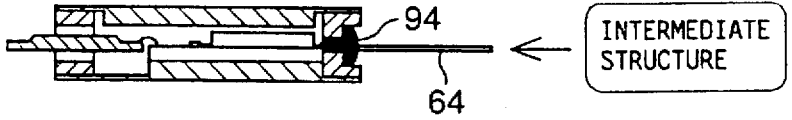

As shown in FIG. 26C, the lid 66 is mounted on the metal case 63, and the optical fiber cut-piece 64 with the solder piece 94 fixed is inserted in the mounting board 21 through the recessed portion 63c of the metal case 63. Since the solder piece 94 serves as the stopper to position the optical fiber cut-piece 64 on the mounting board 21, the positioning of the optical fiber cut-piece 64 is performed with a high level of accuracy.

As previously described with FIGS. 6A through 7B, the insertion hole 41 (or 41A) with a high level of accuracy can be formed by connecting the mounting board 21 and the retaining board 69. As previously described with FIG. 14, the positioning of the insertion hole 41 of the mounting board 21 to the insertion hole 63a of the metal case 63 with a high level of accuracy can be performed. Therefore, the optical fiber cut-piece 64 can easily pass through the insertion hole 63a of the metal case 63 in the present embodiment.

As previously described with FIGS. 8A and 8B, the glass capillary 43 can be used instead of the retaining board 69 to form the insertion hole 41B in the present embodiment.

Other steps of the method of producing the optical module of the present embodiment are essentially the same as corresponding steps of the production method of the sixth embodiment in FIGS. 13A through 13G.

In the above thirteenth embodiment of FIGS. 26A through 26G, the metal case 63 has the recessed portion 63c (FIG. 21B) with the stepped surface having a rectangular cross-section. However, the above embodiment may also be applied to the metal case 63 having the recessed portion 63b (FIG. 21A) with the tapered surface.

Figure 26F:
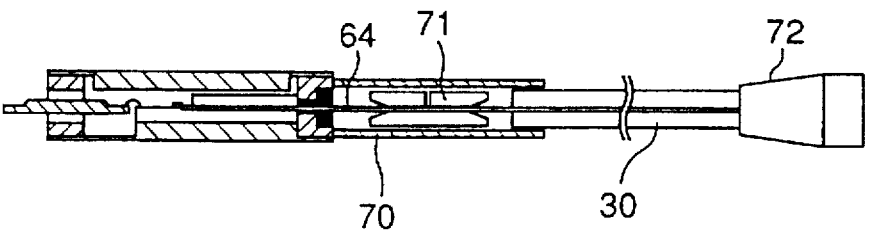

FIGS. 27A through 27D show a method of the connection of the optical fiber using the insert holder 70. The insert holder 70 is as shown in FIGS. 13F and 26F.

Referring to FIGS. 27A through 27D, the insert holder 70 has a lower base 70B and an upper retainer 70C. FIG. 27D is a cross-sectional view of the optical module taken along a line A—A' in FIG. 27C. The glass capillary 71 is mounted on the lower base 70B and fixed thereto. As shown in FIG. 27B, after the optical fiber cut-piece 64 is fixed to the metal case 63, the optical fiber cut-piece 64 is inserted into the glass capillary 71 on the lower base 70B of the insert holder 70.

A core of the optical fiber 30 is inserted into the glass capillary 71. A slit 71a of the glass capillary 71 is filled with the adhesive agent to connect together the optical fiber 30 and the optical fiber cut-piece 64.

As shown in FIG. 27C, an adhesive agent 98 is supplied to the periphery of the glass capillary 71 so that the glass capillary 71 is enclosed by the adhesive agent 98. This adhesive agent 98 is any type of urethane resin, polyimide resin and silicon resin. Finally, the glass capillary 71 is sealed by the upper retainer 70C.

In the previous embodiments shown in FIGS. 13F and 26F, the adhesive agent 98 is not shown. It is desirable to use the adhesive agent 98 as in the above embodiment shown in FIG. 27C. The adhesive agent 98 serves to avoid damage or cut-away of the core of the optical fiber 30.

As shown in FIGS. 27A through 27D, the metal case 63 has a recessed portion which is similar to the recessed portion 63b shown in FIG. 21A.

Figure 28:
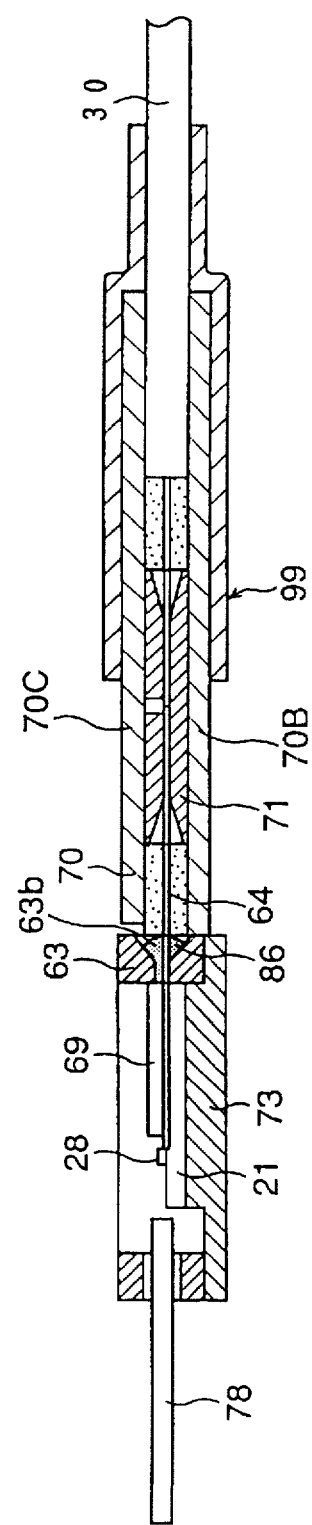
FIG. 28 is a diagram showing a connection of the insert holder and the optical fiber by using a heat-shrinking tube.

FIG. 28 shows a modification of the optical module in FIG. 27C. As shown in FIG. 28, the optical module includes a heat-shrinkage tube 99 which connects the insert holder 70 and the optical fiber 70, in addition to the construction shown in FIG. 27C.

Figure 29A:
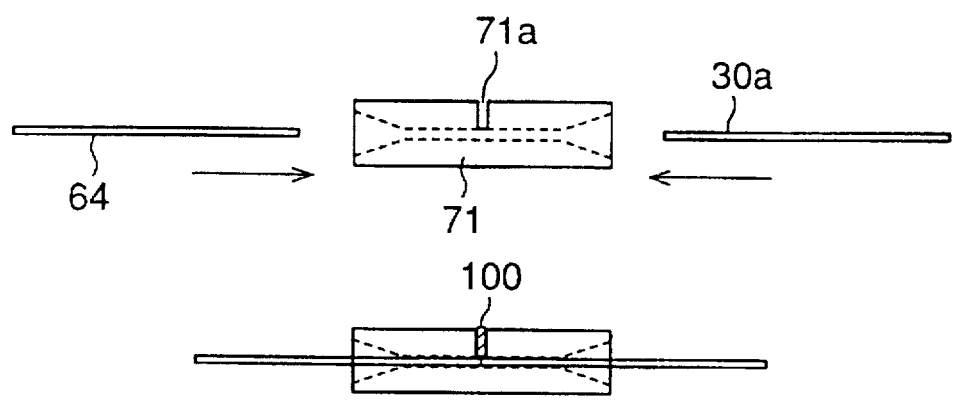
FIGS. 29A and 29B are diagrams of an optical module in a fourteenth embodiment of the present invention.
Figure 29B:
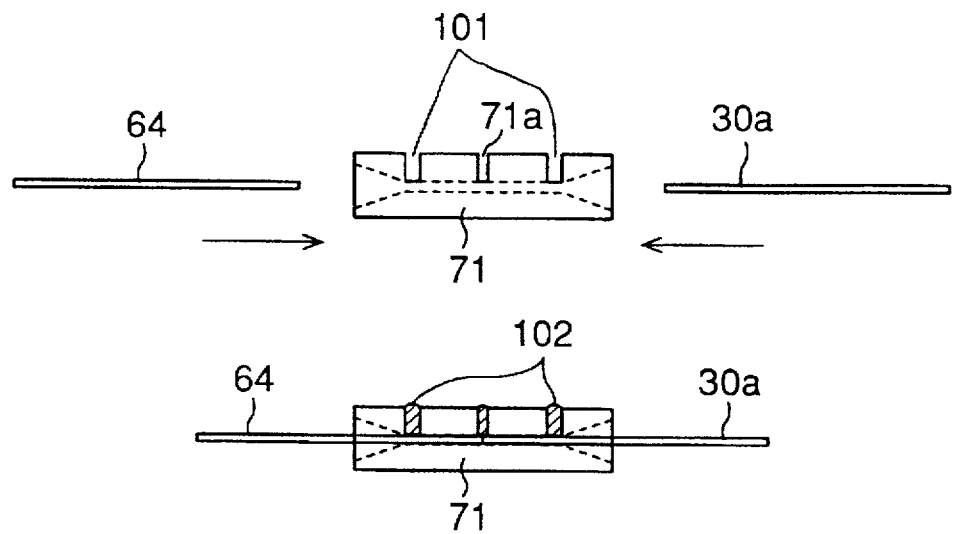

FIGS. 29A and 29B show an optical module in a fourteenth embodiment of the present invention. This embodiment improves the connection of the optical fibers by using the glass capillary.

Referring to FIG. 29A, the glass capillary 71 (FIGS. 13F, 26F and 27C) is used to connect an optical fiber 30a and the optical fiber cut-piece 64. The glass capillary 71 is the same as those shown in FIGS. 13F, 26F and 27C. The glass capillary 71 includes the slit 71a, and the slit 71a is filled with an adhesive agent 100. The optical fiber cut-piece 64 and the optical fiber 30a are connected by the adhesive agent 100 included in the slit 71a, as shown. This adhesive agent 100 serves to match the refraction rates of the optical fibers.

Referring to FIG. 29B, the glass capillary 71 includes slits 101 in addition to the slit 71a, and the slits 101 are located on both sides of the slit 71a. Similarly to that shown in FIG. 29A, the glass capillary 71 is used to connect the optical fiber 30a and the optical fiber cut-piece 64 in this embodiment. The slit 71a is filled with the adhesive agent 100 so that the optical fibers 30a and 64 are connected, and the slits 101 are filled with an adhesive agent 102. The adhesive agent 102 serves to reinforce the connection of the optical fibers. The strength of the connection of the optical fibers to resist a tensile stress is increased by this adhesive agent 102.

Figure 30:
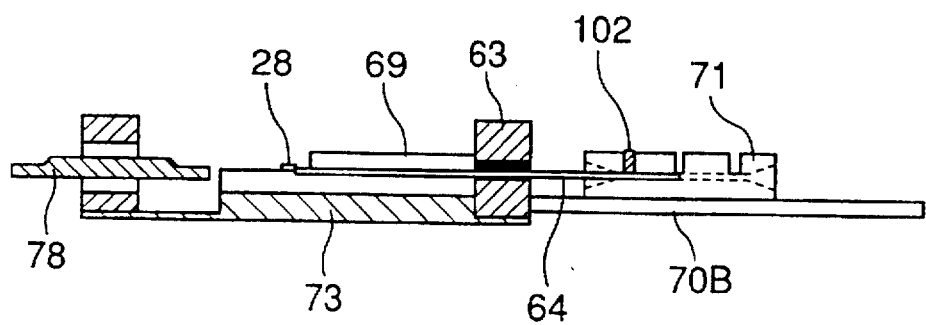
FIG. 30 is a diagram of an intermediate structure of the optical module using an insert holder.

FIG. 30 shows an intermediate structure of the optical module in the present embodiment. Referring to FIG. 30, the intermediate structure of the optical module includes the glass capillary 71 shown in FIG. 29B. In this glass capillary 71, the optical fiber cut-piece 64 is fixed to the glass capillary 71. Instead of the glass capillary 71 in FIG. 27B, this glass capillary 71 is used in the fourteenth embodiment. The intermediate structure of this embodiment prevents a misalignment of the optical fiber cut-piece 64 and the glass capillary 71 on the optical module which may take place during the assembly.

In the intermediate structure shown in FIG. 30, the glass capillary 71 and the insert holder 70 are provided on a lower base 70B. The lower base 70B protects the optical fiber cut-piece 64 from being harmed or damaged. Therefore, the intermediate structure of this embodiment is very effective to prevent damage of the optical fiber cut-piece 64, and the intermediate structure can easily be handled during the production.

Further, the present invention is not limited to the above-described embodiments, and variations and modifications may be made without departing from the scope of the present invention.

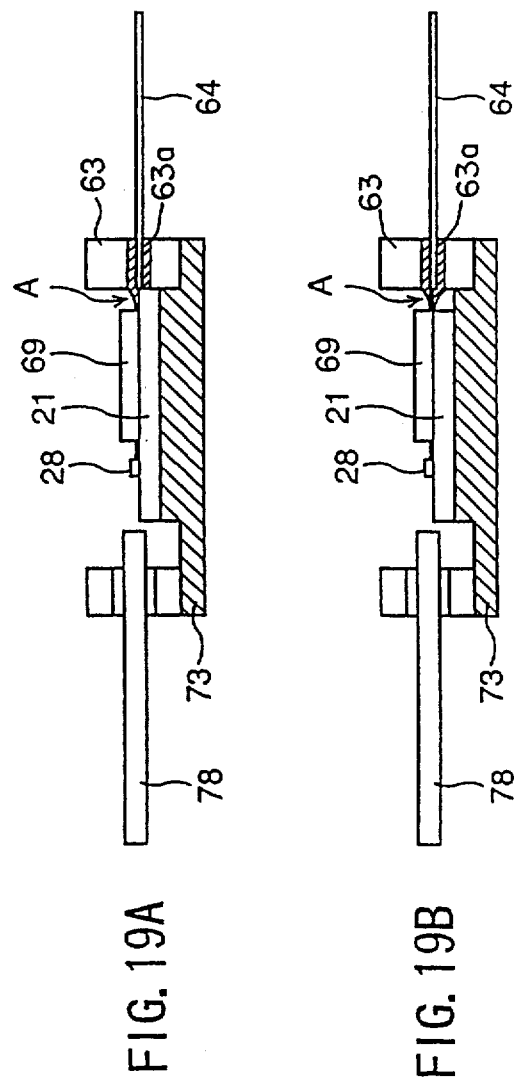

What is claimed is:

1. An optical module comprising:
  a mounting board having an upper surface and a longitudinal optical axis parallel thereto;
  an optical element supported on the upper surface of the mounting board and having an optical axis aligned with the longitudinal optical axis;
  a groove extending longitudinally in the mounting board, centrally thereof and parallel to the optical axis, and having an open end at a first end of the mounting board and a closed end, longitudinally displaced from the first end at an internal position within the mounting board;
  an optical fiber having an optical axis, the optical fiber inserted in and supported by the groove in the mounting board to align the optical axis thereof with the longitudinal optical axis, the groove having a vertical stopper surface therein, perpendicular to the longitudinal optical axis and displaced axially from the closed end of the groove, the vertical stopper surface abutted by a free, leading end of the optical fiber when inserted therein; and
  a positioning mark provided on the mounting board and defining a mounting position of the optical element on the mounting board at which the optical element, with an optical axis thereof aligned with the longitudinal optical axis, is displaced by a prescribed longitudinal distance from a free, leading end of an inserted optical fiber as determined by the abutment thereof with the vertical stopper surface, the positioning mark being located adjacent to the closed end of the groove and at a prescribed distance from the stopper surface.

2. The optical module according to claim 1, wherein the groove further includes a first longitudinal portion, extending from the open end and to the vertical stopper surface, having a first width and a second longitudinal portion, extending from the vertical stopper surface to the closed end of the groove, and having a second width smaller than the first width, the first portion receiving the inserted optical fiber therein and the positioning mark being located adjacent the closed end of the groove.

3. An optical module as recited in claim 1, wherein the positioning mark projects longitudinally over the closed end of the groove and toward the free, leading end of the inserted optical fiber.

4. The optical module according to claim 3, wherein the groove comprises first and second spaced longitudinally extending sidewalls and the vertical stopper surface is defined by a pair of first and second projections, integral with and respectively extending laterally inwardly from the first and second sidewalls, transversely to the optical axis, an outer portion of the optical fiber engaging the first and second projections and a central portion of the optical fiber being exposed, between the first and second projections, to the optical element supported on the mounting board.

5. The optical module according to claim 3, wherein the positioning mark is supported on a projecting portion of an insulating layer formed on the upper surface of the mounting board.

6. The optical module according to claim 1, further comprising:
  a cylindrical member provided within the groove and fixed to the mounting board, the optical fiber being inserted into the cylindrical member.

7. The optical module according to claim 6, wherein the cylindrical member has an inside diameter which is greater than an outside diameter of the optical fiber.

8. An optical module as recited in claim 1, further comprising:
  a retaining board adapted for assembly with the mounting board on the upper surface thereof and having a second, central longitudinal groove therein, the central longitudinal groove of the retaining board, when the retaining board is assembled on the upper surface of the mounting board, extending in the direction of and aligned with the optical axis of the optical fiber, the first groove and the second groove being in mating relationship and defining a longitudinal insertion hole through which the optical fiber is inserted.

9. The optical module according to claim 8, wherein the mounting board includes first portions and the retaining board includes second portions, the second portions being connected to the first portions to position the mounting board and the retaining board with respect to each other.

10. The optical module according to claim 9, wherein the first portions are first fitting grooves and the second portions are second fitting grooves, the first fitting grooves and the second fitting grooves being associated to form other insertion holes, and the optical module further comprising cylindrical parts inserted into the other insertion holes.

11. The optical module according to claim 9, wherein the first portions are fitting grooves and the second portions are fitting projections, the fitting grooves receiving the fitting projections and thereby positioning and interconnecting the mounting board and the retaining board with respect to each other.

12. The optical module according to claim 1, further comprising:
a case in which the mounting board is supported and sealed,
the case including a base on which the mounting board is supported and fixed, sidewalls surrounding the base including an end sidewall having an insertion hole extending therethrough and aligned with the longitudinal groove and through which the optical fiber is axially inserted, the case having a lid affixed to top edges of the sidewalls and sealing the mounting board therein and the insertion hole being filled with a solder to fix the optical fiber to the case.

13. The optical module according to claim 12, wherein the base of the case has a lateral width with respect to a direction perpendicular to the optical axis, the lateral width of the base being the same as a lateral width of the mounting board.

14. The optical module according to claim 12, wherein at least one of the base of the case and a bottom of the mounting board in contact with the base includes one of an array of projections and an array of recesses formed on the at least one of the base of the case and the bottom of the mounting board.

15. The optical module according to claim 12, wherein the optical fiber has a protection coating surrounding an axial portion of the optical fiber, which axial portion is disposed within the insertion hole, and a metal plating formed on the protection coating and joined to the sidewall surrounding the insertion hole.

16. The optical module according to claim 12, wherein a first portion of the groove, extending longitudinally from the first, open end thereof, has an inwardly tapered configuration defined by a taper angle of 53.14° or less.

17. The optical module according to claim 12, wherein a center of the insertion hole of the case is located above a center of the optical fiber when the optical fiber is enclosed by the groove of the mounting board.

18. The optical module according to claim 12, wherein the mounting board is displaced longitudinally from the end sidewall of the case in which the insertion hole is provided.

19. The optical module according to claim 12, wherein the case has a recessed portion located adjacent to the insertion hole, the recessed portion being filled with solder affixing the optical fiber to the case.

20. The optical module according to claim 19, wherein the recessed portion has a tapered surface merging with the insertion hole.

21. The optical module according to claim 19, wherein the recessed portion has a stepped surface having a rectangular cross-section.

22. The optical module according to claim 19, wherein the solder is provided in the recessed portion of the case before the optical fiber is inserted in case.

23. The optical module according to claim 19, wherein the solder is provided at a predetermined position of the optical fiber before the optical fiber is inserted in the case.

24. The optical module according to claim 19, wherein the recessed portion has a metal plating layer.

25. The optical module according to claim 19, wherein the recessed portion has a roughened surface.

26. The optical module according to claim 19, wherein the recessed portion has plural grooves therein radially extending from a center of the insertion hole.

27. The optical module according to claim 12, further comprising:
a holder connected to a side wall of the case at which the insertion hole is provided, the optical fiber being supported by the holder.

28. The optical module according to claim 27, wherein the holder has a glass capillary therein providing an optical connection between the optical fiber, inserted in the groove of the mounting board, to an external optical fiber.

29. The optical module according to claim 27, wherein the holder has an adhesive agent therein affixing the optical fiber thereto.

30. The optical module according to claim 28, wherein the glass capillary has a plurality of slits extending through a sidewall thereof and into which an adhesive agent is infected, the injected adhesive agent affixing the optical fiber to the glass capillary.

31. The optical module according to claim 1, wherein the mounting board comprises a silicon substrate.

32. The optical module according to claim 1, further comprising a connector connecting the optical module to an external device.

33. The optical module as claimed in claim 1, wherein the positioning mark defines the mounting position of the optical element in accordance with visually observing a front edge of the optical element relatively to the positioning mark as illuminated by visible light.

34. The optical module as claimed in claim 1, wherein the mounting board is made of silicon.

35. The optical module as claimed in claim 1, wherein the axial length of the optical fiber is different from the axial length of the groove.

36. An optical module, comprising:
a mounting board having upper and lower surfaces, spaced sidewalls extending longitudinally, first and second opposite end walls and a longitudinally extending optical axis parallel to the upper surface;
a groove formed in the mounting board, of a first depth therein, extending longitudinally and in a first direction from a first, open end thereof at the first end wall of the mounting board to a second, closed end thereof at a location intermediate the first and second end walls of the mounting board, the groove configured to receive and support an optical fiber inserted therein with an optical axis of the optical fiber aligned with the longitudinal optical axis;
a stopper surface, within the groove and transverse to the optical axis, a free end of an inserted optical fiber abutting the stopper surface; and
a positioning mark supported on the upper surface of the mounting board at a first distance along the longitudinal optical axis from the stopper surface and at a second distance along the longitudinal optical axis from the second, closed end of the groove for positioning an optical element on the upper surface of the mounting board and with an optical axis thereof aligned with the longitudinal optical axis.

37. An optical module as recited in claim 36, wherein the positioning mark is supported on the upper surface of the mounting board at a first distance, in the first direction from the stopper surface and at a second distance, in the first direction, from the closed end of the groove.

38. An optical module as recited in claim 37, wherein the groove comprises a first portion of a first width in a lateral direction transverse to the longitudinal optical axis, extending longitudinally from the first, open end thereof and to the stopper surface and a second width in the lateral direction, less than the first width, extending longitudinally from the stopper surface to the second, closed end thereof.

39. An optical module as recited in claim 38, wherein the groove comprise a first portion of a first depth, extending longitudinally from the first open end thereof to the stopper surface, and a second portion of a second depth, extending longitudinally from the stopper surface to the second, closed end thereof.

40. An optical module as recited in claim 39, further comprising a second groove in the mounting board, of the first depth and extending laterally, transversely to and crossing the first groove, and having a sidewall adjacent to the second, closed end of the longitudinal groove, the sidewall of the second groove defining the stopper surface.

41. An optical module as recited in claim 40, wherein the second portion of the groove, of the second width, has a bottom surface inclined in the longitudinal direction from a second depth at the stopper surface, which is less than the first depth, to the upper surface of the mounting board at the second, closed end of the groove.

42. An optical module as recited in claim 36, wherein the positioning mark is supported on the upper surface of the mounting board at a first distance, in the first direction from the stopper surface, and at a second distance, in a second direction opposite to the first direction, from the closed end of the groove.

43. An optical module as recited in claim 42, wherein the groove comprises first and second spaced, longitudinally extending sidewalls and the stopper surface is defined by a pair of first and second projections, integral with and extending laterally inwardly from the first and second sidewalls, respectively and transversely to the optical axis, an outer portion of the optical fiber engaging the first and second projections and a central portion of the optical fiber being exposed between the first and second projections to an optical element supported on the mounting board.

44. An optical module as recited in claim 48, wherein the groove comprises a first portion having a first bottom surface of a first depth, relatively to the upper surface of the mounting board, extending longitudinally from the first open end of the groove to the stopper surface and to and through the first and second projections and a second portion, of a varying depth and having a second, inclined bottom surface extending from the first depth of the first bottom surface to the upper surface of the mounting board at the second, closed end of the groove.

45. The optical module as claimed in claim 36, wherein the positioning mark defines the mounting position of the optical element in accordance with visually observing a front edge of the optical element relatively to the positioning mark as illuminated by visible light.

46. The optical module as claimed in claim 36, wherein the mounting board is made of silicon.

47. The optical module as claimed in claim 36, wherein the axial length of the optical fiber is different from the axial length of the groove.

* * * * *

UNITED STATES PATENT AND TRADEMARK OFFICE
CERTIFICATE OF CORRECTION

Page 1 of 2

PATENT NO. : 5,748,822
DATED : May 5, 1998
INVENTOR(S) : MIURA et al.

It is certified that error appears in the above-identified patent and that said Letters Patent is hereby corrected as shown below: In the drawings, Replace Sheet 18 of 29 of the drawings, containing FIGS. 19A and 19B, with the attached, correct drawing.

Col. 17, line 41, after "member" insert --(i.e., signal conductor)--.

Col. 22, line 18 (Claim 4, line 2), after "spaced" insert --,--;
        line 47 (Claim 8, line 9), begin a new paragraph with "the first".

Signed and Sealed this

Twenty-ninth Day of June, 1999

Attest:

Q. TODD DICKINSON

*Attesting Officer*      *Acting Commissioner of Patents and Trademarks*